US012298689B2

(12) United States Patent
Kakubari et al.

(10) Patent No.: US 12,298,689 B2
(45) Date of Patent: May 13, 2025

(54) IMAGE FORMING APPARATUS HAVING FIXING DEVICE WITH IMPROVED UNIFORMITY OF HEATING WHEN RECIPROCATED IN WIDTHWISE DIRECTION

(71) Applicant: CANON KABUSHIKI KAISHA, Tokyo (JP)

(72) Inventors: Koichi Kakubari, Chiba (JP); Ikuo Nakamoto, Chiba (JP); Akihiro Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/340,696

(22) Filed: Jun. 23, 2023

(65) Prior Publication Data

US 2024/0069472 A1 Feb. 29, 2024

(30) Foreign Application Priority Data

Aug. 26, 2022 (JP) ................................ 2022-134972

(51) Int. Cl.
*G03G 15/20* (2006.01)
*G03G 21/20* (2006.01)

(52) U.S. Cl.
CPC ..... *G03G 15/2017* (2013.01); *G03G 15/2042* (2013.01); *G03G 21/206* (2013.01)

(58) Field of Classification Search
CPC ........... G03G 15/2039; G03G 15/2017; G03G 15/2042; G03G 15/2046; G03G 21/206; G03G 2221/1645
USPC .............................. 399/69, 92, 334; 219/216
See application file for complete search history.

(56) References Cited

U.S. PATENT DOCUMENTS

| | | | | |
|---|---|---|---|---|
| 7,200,354 B2 | 4/2007 | Nakamoto et al. | .... | G03G 15/20 |
| 7,406,288 B2 | 7/2008 | Nakamoto et al. | .... | G03G 15/20 |
| 7,457,576 B2 | 11/2008 | Takada et al. | ......... | G03G 15/20 |
| 7,466,950 B2 | 12/2008 | Matsuura et al. | ..... | G03G 15/20 |
| 7,542,711 B2 | 6/2009 | Nakamoto et al. | .... | G03G 15/20 |
| 7,596,348 B2 | 9/2009 | Nakamoto et al. | .... | G03G 15/20 |
| 7,792,477 B2 | 9/2010 | Nakamoto et al. | .... | G03G 15/20 |
| 7,844,208 B2 | 11/2010 | Hayashi et al. | ....... | G03G 15/20 |
| 8,554,097 B2 | 10/2013 | Hara et al. | ............. | G03G 15/20 |
| 9,291,958 B2 | 3/2016 | Nakamoto et al. | .... | G03G 15/20 |
| 9,354,570 B2 | 5/2016 | Arimoto et al. | ....... | G03G 15/20 |

(Continued)

FOREIGN PATENT DOCUMENTS

| | | | |
|---|---|---|---|
| JP | 2000-194216 | 7/2000 | |
| JP | 2013-134421 | 7/2013 | |
| JP | 5930779 B2 * | 6/2016 | ......... G03G 15/2017 |

*Primary Examiner* — Robert B Beatty
(74) *Attorney, Agent, or Firm* — Venable LLP

(57) ABSTRACT

An image forming apparatus includes a fixing device, first and second fans, and a reciprocating portion to reciprocate the fixing device in a widthwise direction of the fixing device. The fixing device includes a fixing film, a pressing roller to form a nip portion where a recording material on which a toner image is carried is nipped and conveyed between the fixing film and the pressing roller and the toner image is fixed on the recording material. The first and second fans send an air from openings thereof toward first and second areas of the fixing film on both end sides in the widthwise direction. A controller changes at least one opening width of the first and second fans depending on a position with respect to the widthwise direction of the fixing device.

11 Claims, 19 Drawing Sheets

(56) References Cited

U.S. PATENT DOCUMENTS

| | | | | |
|---|---|---|---|---|
| 9,488,938 | B2 | 11/2016 | Tamaki et al. | G03G 15/20 |
| 9,504,096 | B2 | 11/2016 | Kakubari et al. | G03G 15/20 |
| 9,513,592 | B2 | 12/2016 | Akiyama et al. | G03G 15/20 |
| 9,519,250 | B2 | 12/2016 | Asaka et al. | G03G 15/20 |
| 10,228,643 | B2 | 3/2019 | Nakamoto | G03G 15/20 |
| 10,274,877 | B2 | 4/2019 | Maeda et al. | G03G 15/20 |
| 10,437,185 | B2 | 10/2019 | Yamaguchi et al. | G03G 15/20 |
| 10,545,442 | B1 | 1/2020 | Hirano et al. | G03G 15/20 |
| 10,564,578 | B2 | 2/2020 | Maeda et al. | G03G 15/20 |
| 11,144,008 | B2 | 10/2021 | Ito et al. | G03G 21/20 |
| 11,163,250 | B2 | 11/2021 | Yasui et al. | G03G 15/20 |
| 11,669,028 | B2 | 6/2023 | Tanaka et al. | G03G 15/20 |
| 2011/0142468 | A1* | 6/2011 | Fujikura | G03G 15/2053 399/122 |
| 2013/0039674 | A1* | 2/2013 | Takami | G03G 15/2017 399/69 |
| 2013/0142536 | A1* | 6/2013 | Takami | G03G 15/2039 399/92 |
| 2014/0147151 | A1* | 5/2014 | Oonishi | G03G 15/2042 399/69 |
| 2014/0147169 | A1* | 5/2014 | Nishinoue | G03G 15/2017 399/329 |
| 2015/0241824 | A1* | 8/2015 | Sekiya | G03G 21/206 399/92 |
| 2019/0086850 | A1* | 3/2019 | Mitsui | G03G 15/2017 |
| 2020/0110359 | A1* | 4/2020 | Ito | G03G 21/206 |
| 2020/0301327 | A1* | 9/2020 | Kawashima | G03G 15/2021 |
| 2022/0011698 | A1 | 1/2022 | Yasui et al. | G03G 15/20 |

* cited by examiner

IMAGE FORMING APPARATUS HAVING FIXING DEVICE WITH IMPROVED UNIFORMITY OF HEATING WHEN RECIPROCATED IN WIDTHWISE DIRECTION

FIELD OF THE INVENTION AND RELATED ART

The present invention relates to image forming apparatuses such as copiers, printers, FAX machines, and multi-functional machines having multiple of these functions.

An image forming apparatus has a fixing device that fixes a toner image on a recording material by heating the toner image carried on the recording material. Such a fixing device, for example, fixes the toner image to the recording material by feeding and heating the recording material on which the toner image is carried in a nip portion formed between a first rotatable member, such as a fixing film, and a second rotatable member, such as a pressure roller, while pressurizing and heating the recording material.

As such a fixing device, a configuration in which the fixing device is moved back and forth in a widthwise direction that intersects a feeding direction of the recording material has been proposed (e.g., Japanese Laid-Open Patent Application No. 2000-194216) in order to prevent partial damage to the first rotatable member.

Furthermore, as a fixing device, a configuration in which an area on the edge side of the first rotatable member is cooled by a fan to prevent a non-passing portion where the recording material does not pass from heating up (non-passing portion heating) has also been proposed (e.g., Japanese Laid-Open Patent Application No. 2013-134421).

As described in Japanese Laid-Open Patent Application No. 2000-194216, when the fixing device is configured to move back and forth (reciprocating operation), the temperature balance of both ends of the first rotatable member in the widthwise direction is disrupted before and after the reciprocating operation of the fixing device. This is because the positional relationship in the widthwise direction between the heater that heats the first rotatable member and the recording material that passes through the nip portion changes before and after the reciprocating operation. For example, when the fixing device is moved to one side of the nip portion from the center position in the widthwise direction by the reciprocating operation, the recording material passes through the nip portion on the other side than the center position. Therefore, the non-passing portion of the first rotatable member is more likely to heat up on one side of the first rotator, while the non-passing portion is less likely to heat up on the other side.

Here, it is conceivable to combine the configuration for cooling the ends of the first rotatable member to suppress the temperature rise of the non-passing portion, as described in Japanese Laid-Open Patent Application No. 2013-134421, with the configuration for reciprocating operation as described above. However, in the case of a conventional configuration that blows air toward the ends of the first rotatable member to suppress the rise in temperature of the non-passing portion, the air flow rate (air flow) to each of the two ends of the first rotatable member is the same. Therefore, the combination of these configurations does not improve the temperature imbalance at both ends of the first rotatable member in the widthwise direction due to reciprocating operation.

The purpose of the present invention is to provide a configuration that can suppress the temperature imbalance at the widthwise direction end of the first rotatable member, even if the fixing device is configured to move back and forth.

SUMMARY OF THE INVENTION

The present invention is an image forming apparatus comprising a fixing device including a first rotatable member, a second rotatable member configured to form a nip portion where a recording material on which a toner image is carried is nipped and conveyed between the first rotatable member and the second rotatable member and the toner image is fixed on the recording material, and a heating portion configured to heat the first rotatable member; an air blowing portion configured to blow air; a first duct configured to guide the air blown from the air blowing portion toward a first area of the first rotatable member on a first end side from a central portion of the first rotatable member with respect to a widthwise direction crossing to a conveyance direction of the recording material; a first shutter capable of changing an opening width of the first duct; a second duct configured to guide the air blown from the air blowing portion toward a second area of the first rotatable member on a second end side opposite to the first end side from the central portion of the first rotatable member with respect to the widthwise direction; a second shutter capable of changing an opening width of the second duct; a reciprocating portion configured to reciprocate the fixing device in the widthwise direction; and a control portion configured to change at least one opening width of the opening width of the first duct formed by the first shutter and the opening width of the second duct formed by the second shutter depending on a position with respect to the widthwise direction of the fixing device.

In addition, an image forming apparatus comprising a fixing device including a first rotatable member, a second rotatable member configured to form a nip portion where a recording material on which a toner image is carried is nipped and conveyed between the first rotatable member and the second rotatable member and the toner image is fixed on the recording material, a heating portion configured to heat the first rotatable member, a first temperature detecting portion configured to detect a temperature of the first rotatable member on a first end side from a central portion of the first rotatable member with respect to a widthwise direction crossing a conveyance direction of the recording material, and a second temperature detecting portion configured to detect a temperature of the first rotatable member on a second end side opposite to the first end side from the central portion with respect to the widthwise direction, a first air blowing portion configured to blow air toward a first area of the first rotatable member on the first end side from the central portion with respect to the widthwise direction, a second air blowing portion configured to blow air toward a second area of the first rotatable member on the second end side from the central portion with respect to the widthwise direction, a reciprocating portion configured to reciprocate the fixing device in the widthwise direction; and a control portion configured to control driving and stopping of the first air blowing portion based on the temperature detected by the first temperature detecting portion and control driving and stopping of the second air blowing portion based on the temperature detected by the second temperature detecting portion, wherein the control portion configured to change at least one temperature of the temperature at which the first air blowing portion starts the driving and the temperature at which the second air blowing portion starts the driving.

Further features of the present invention will become apparent from the following description of exemplary embodiments with reference to the attached drawings.

Figure 5:
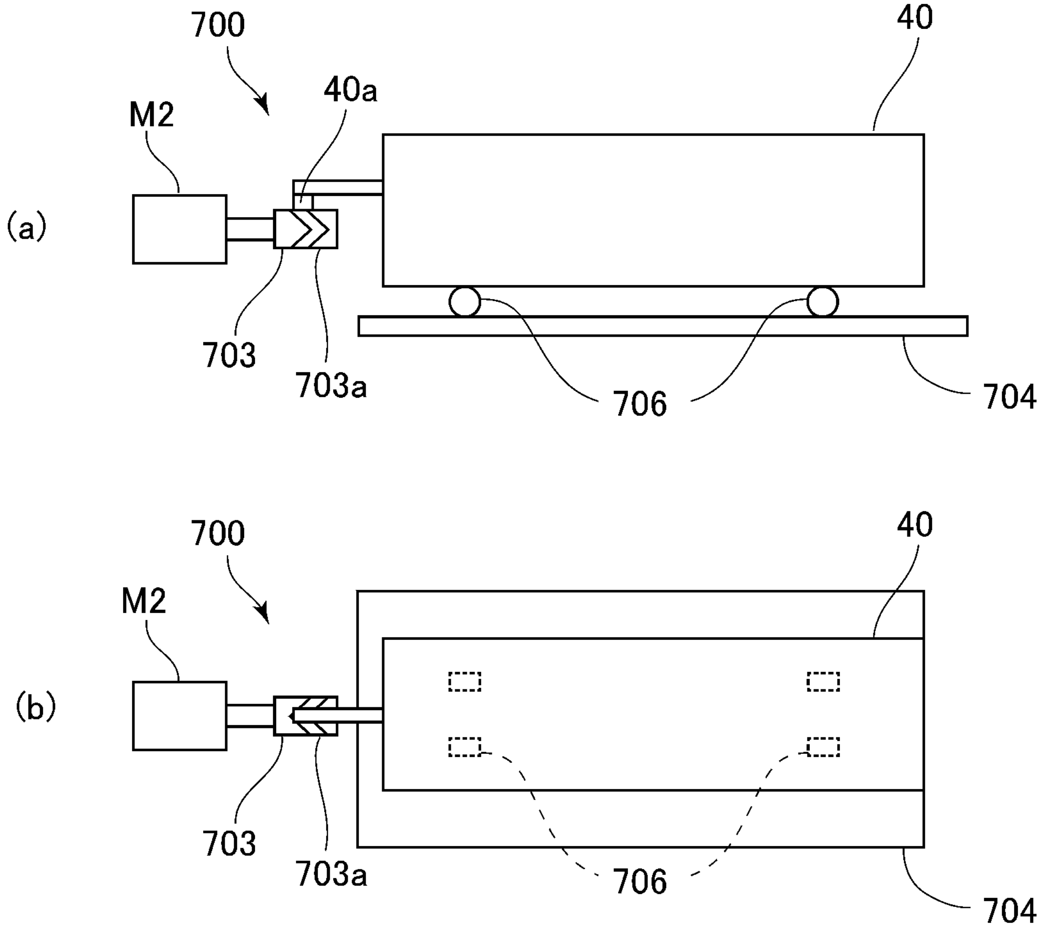

Part (a) of FIG. 5 is a schematic view of a reciprocating mechanism according to the first embodiment from the side, and part (b) of FIG. 5 is a schematic view of the reciprocating mechanism according to the first embodiment from above.

Figure 6:
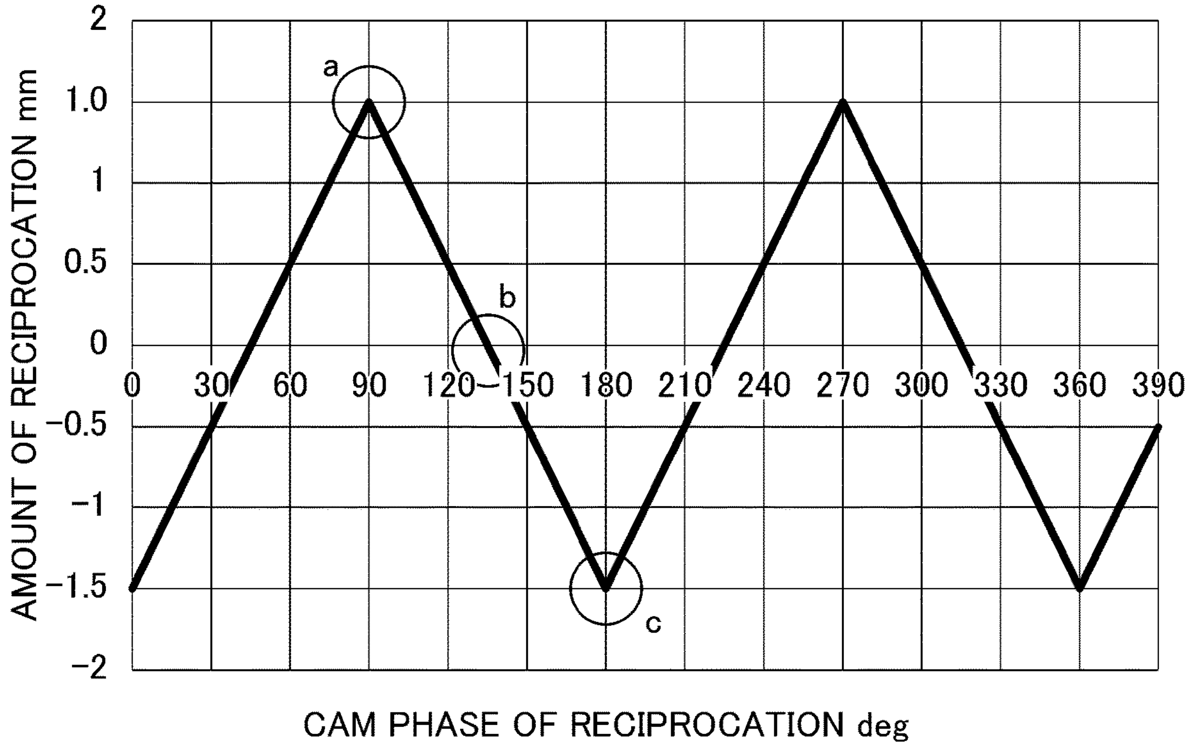

FIG. 6 is a graph showing a relationship between a phase of the reciprocating cam and an amount of reciprocation according to embodiment 1.

Figure 7:
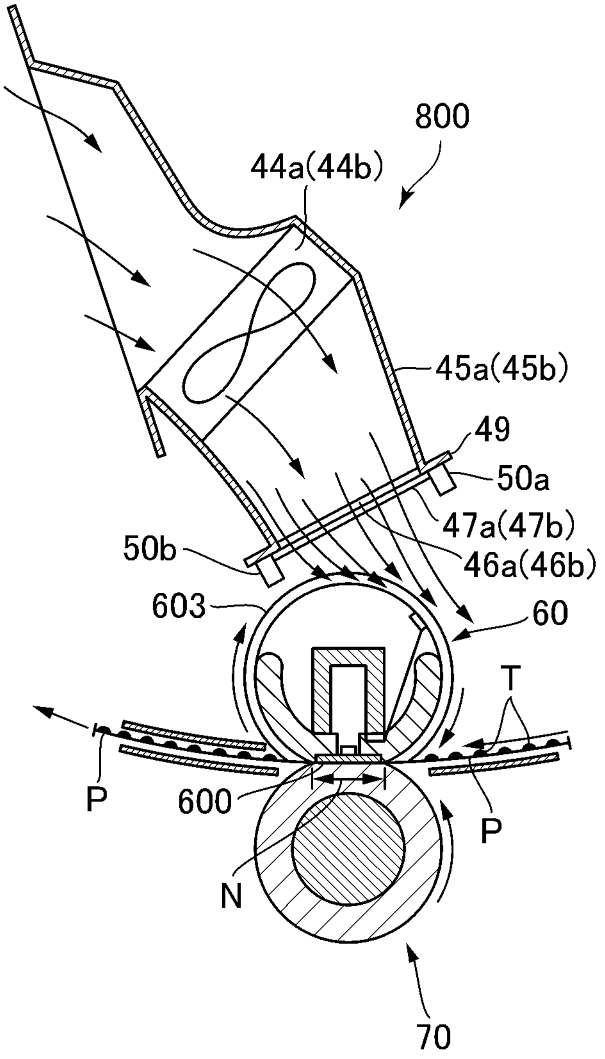

FIG. 7 is a schematic cross-sectional view of the fixing device and cooling mechanism according to embodiment 1.

Figure 8:
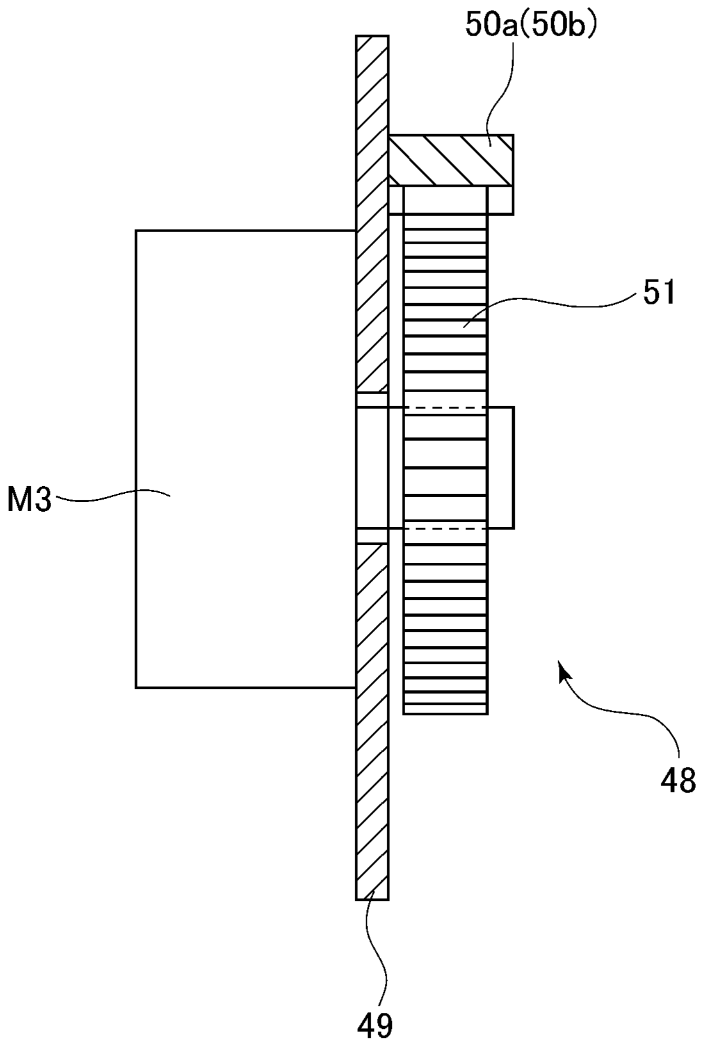

FIG. 8 is a diagram showing the drive configuration of a shutter according to embodiment 1.

Figure 9:
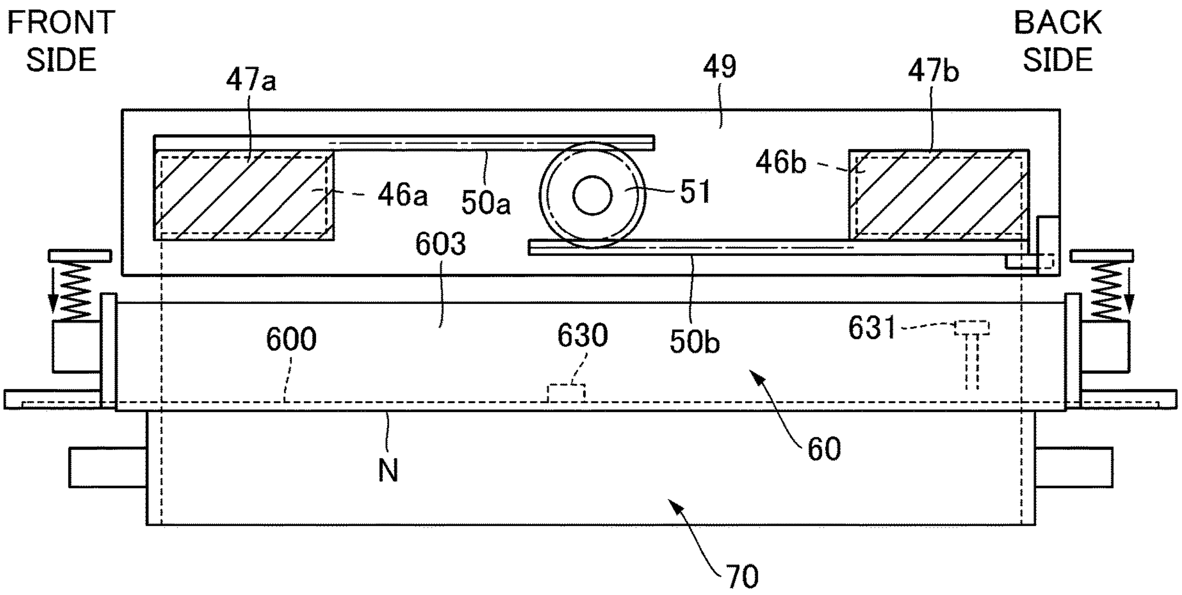

FIG. 9 is a planar schematic view of a drive configuration of the shutter in embodiment 1, showing a fully closed state of the shutter.

Figure 10:
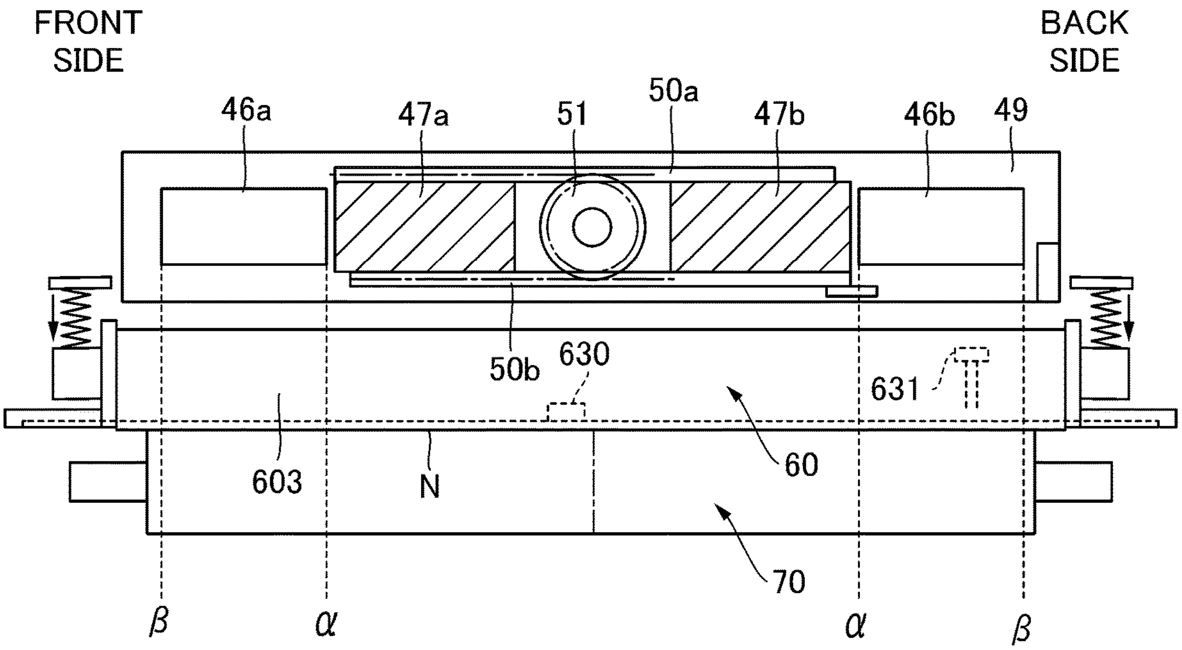

FIG. 10 is a plan schematic view of the drive configuration of the shutter in embodiment 1, showing the shutter in an open state.

Figure 11:
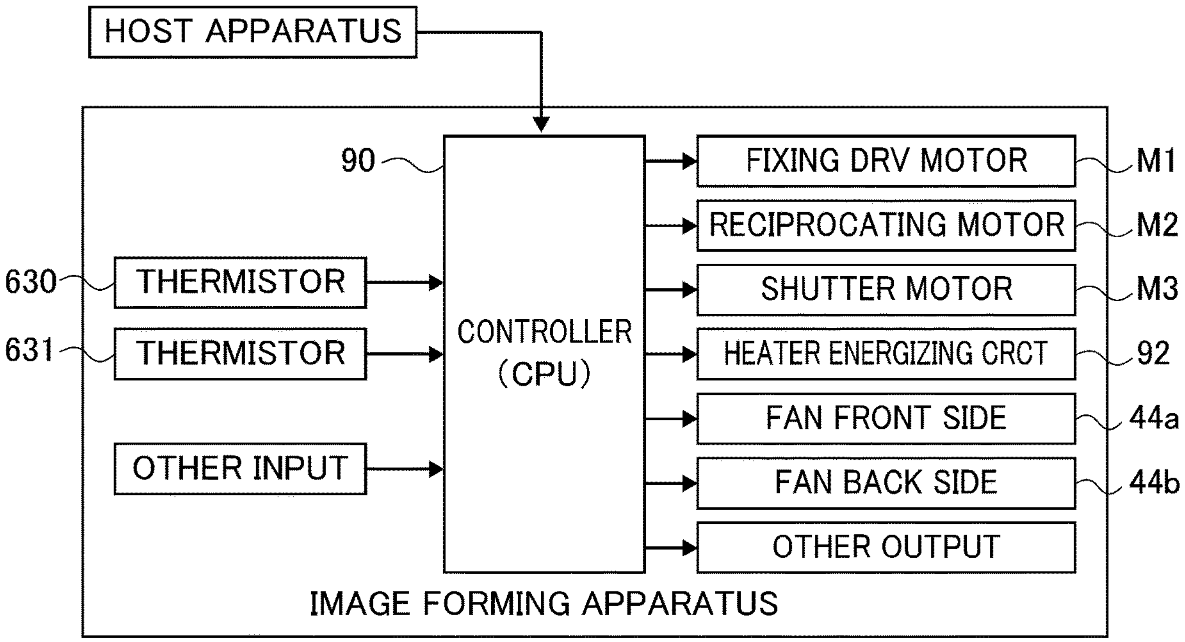

FIG. 11 is a control block view of a main control portion of the image forming apparatus according to embodiment 1.

Figure 12:
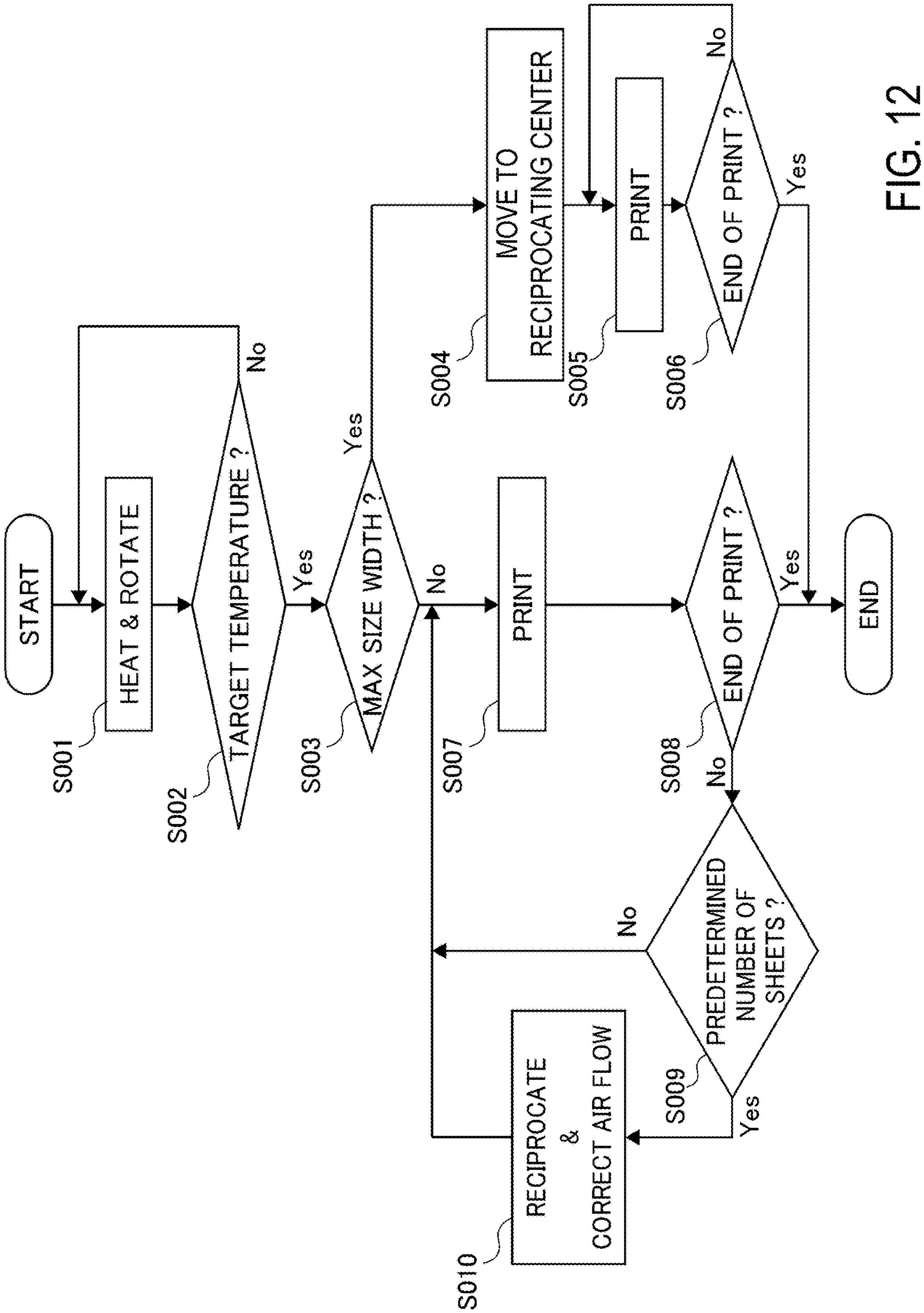

FIG. 12 is a flowchart of control according to embodiment 1 regarding reciprocating operation and fan airflow compensation.

Figure 13:
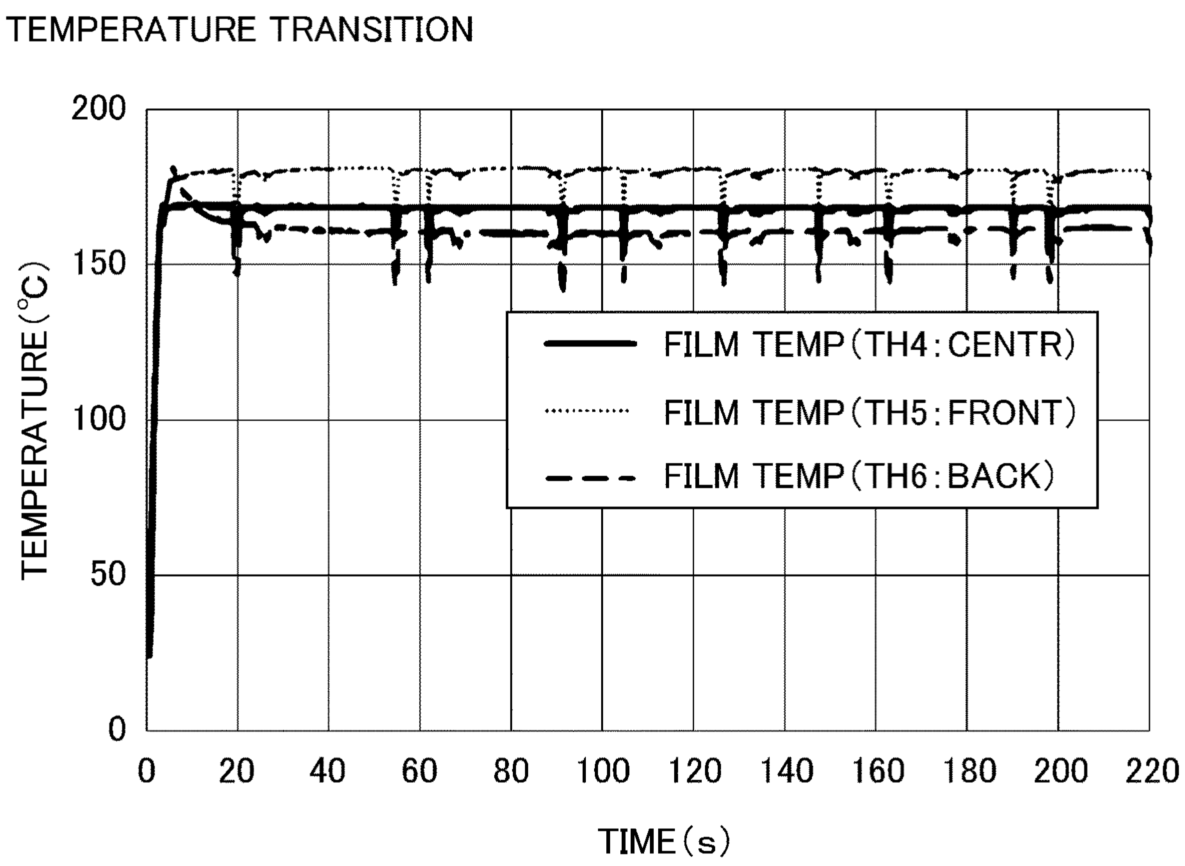

FIG. 13 is a graph showing a temperature transition of a fixing film according to a comparative example.

Figure 14:
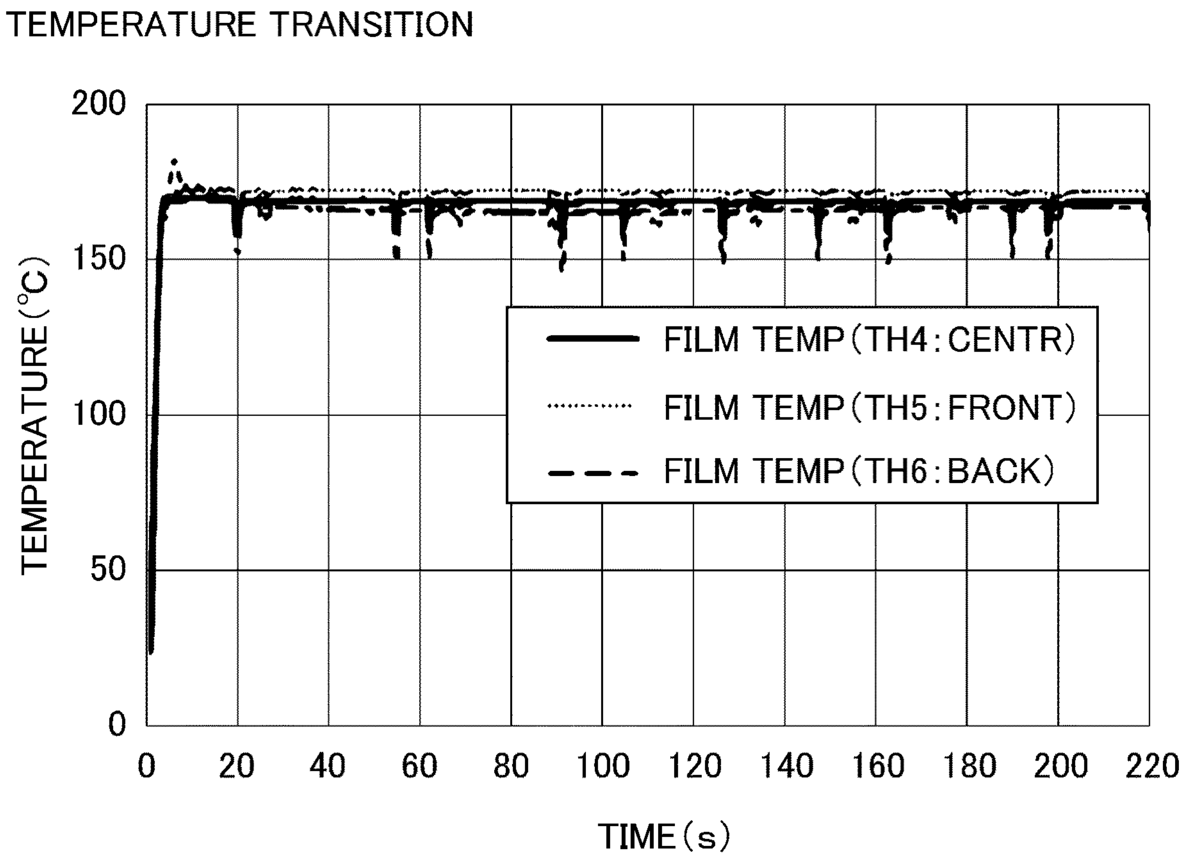

FIG. 14 is a graph showing the temperature transition of the fixing film according to the embodiment.

Figure 15:
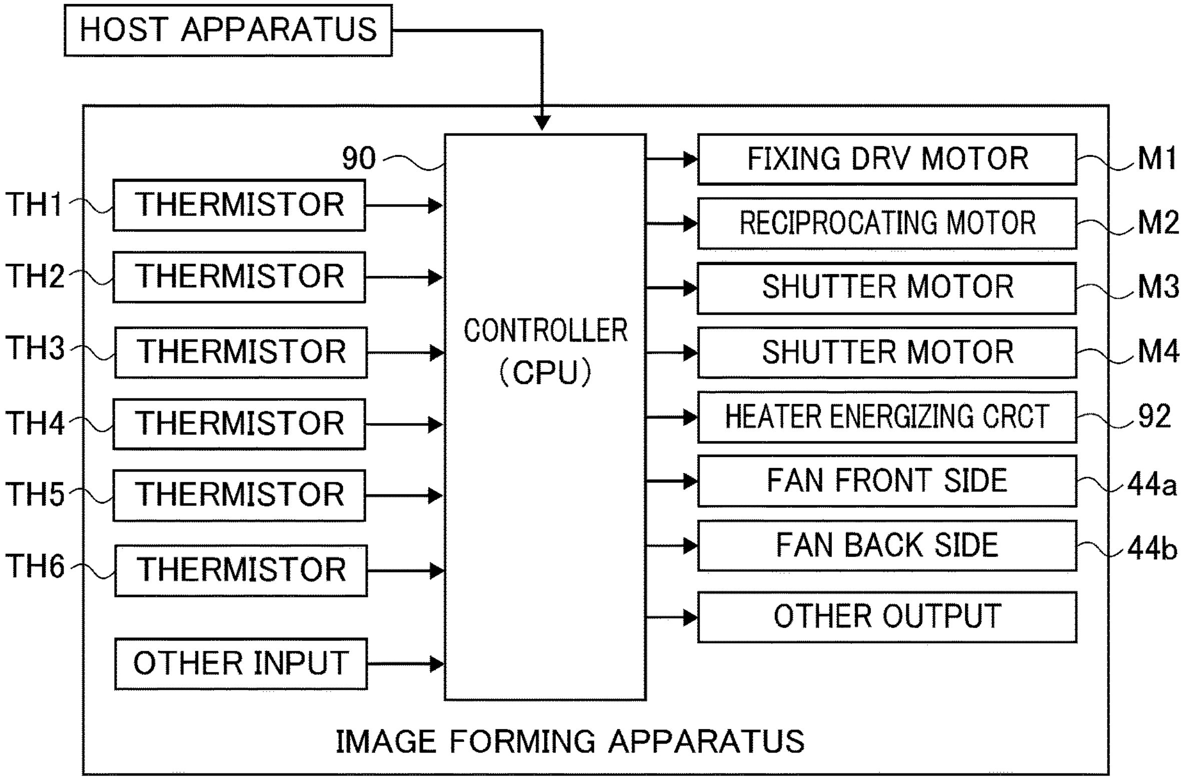

FIG. 15 is a control block diagram of the main control portion of the image forming apparatus according to embodiment 2.

Figure 16:
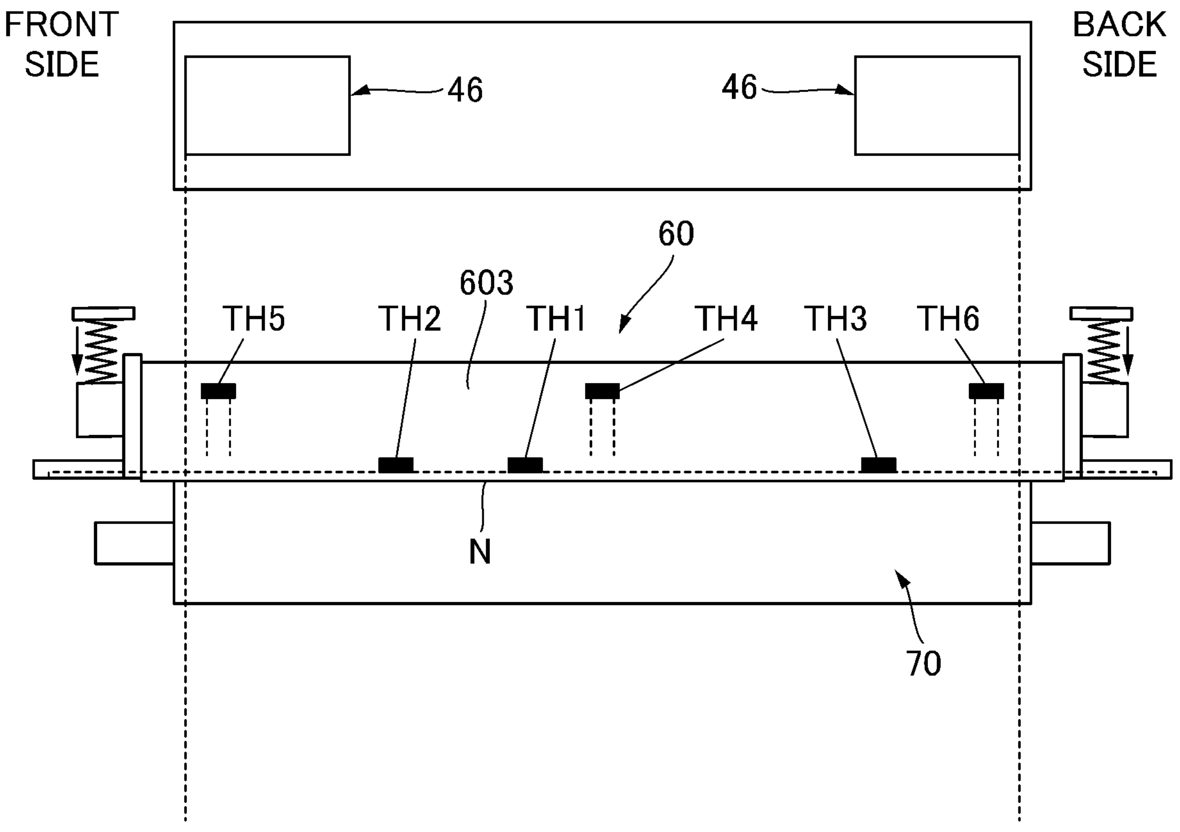

FIG. 16 is a schematic view showing a relationship between a thermistor arrangement and a duct opening of the fixing device according to embodiment 2.

Figure 17:
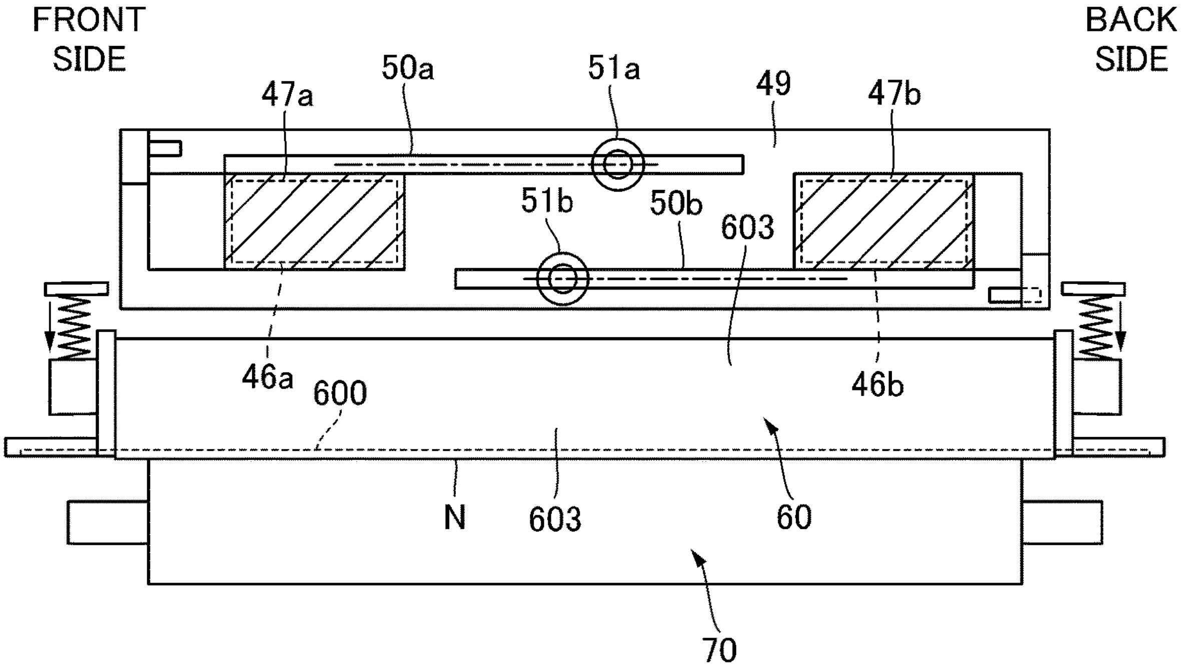

FIG. 17 is a schematic view of a plan view of a drive configuration of the shutter according to embodiment 2.

Figure 18:
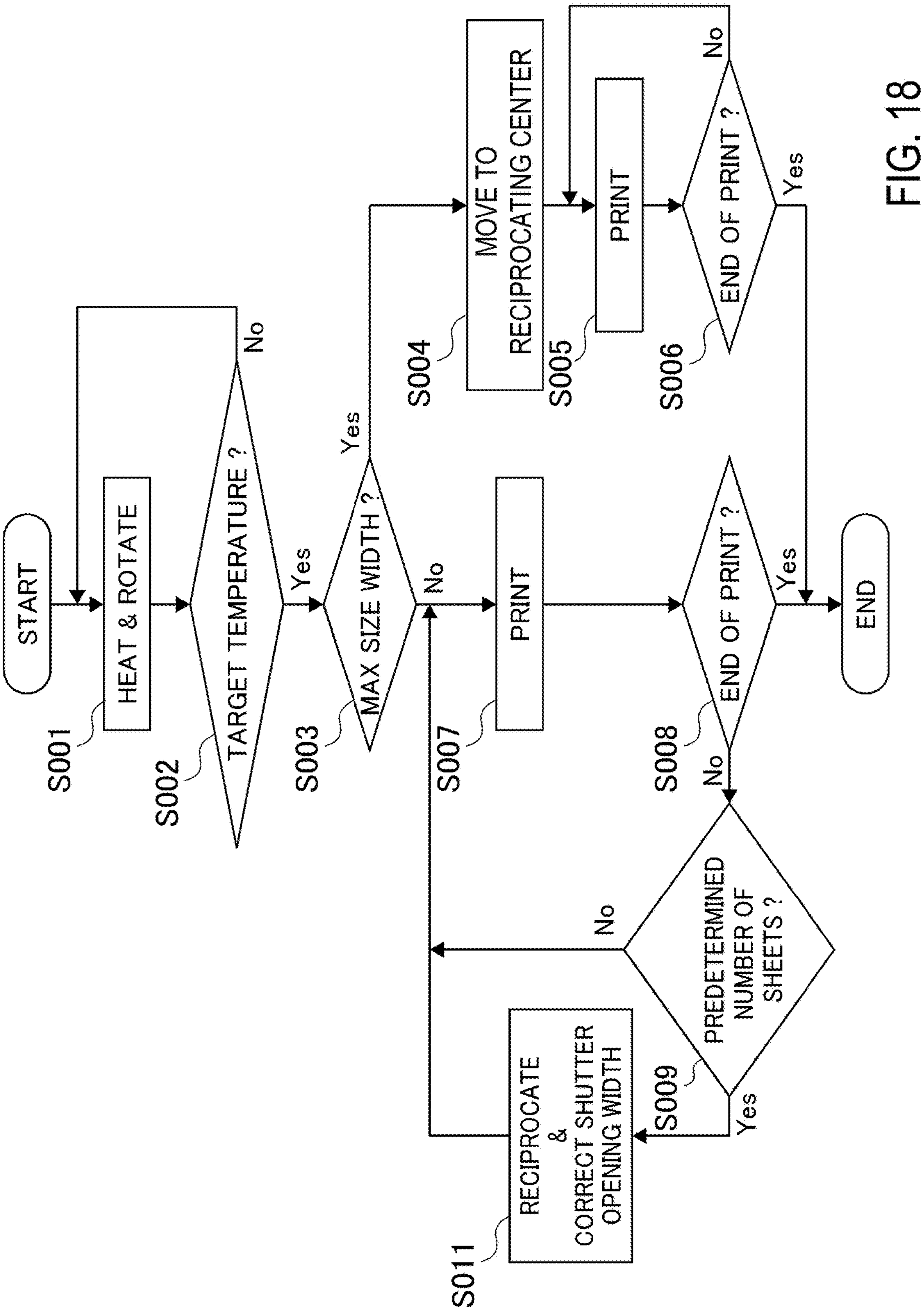

FIG. 18 is a flowchart of the control regarding reciprocation operation and opening width correction by the shutter according to embodiment 2.

Figure 19:
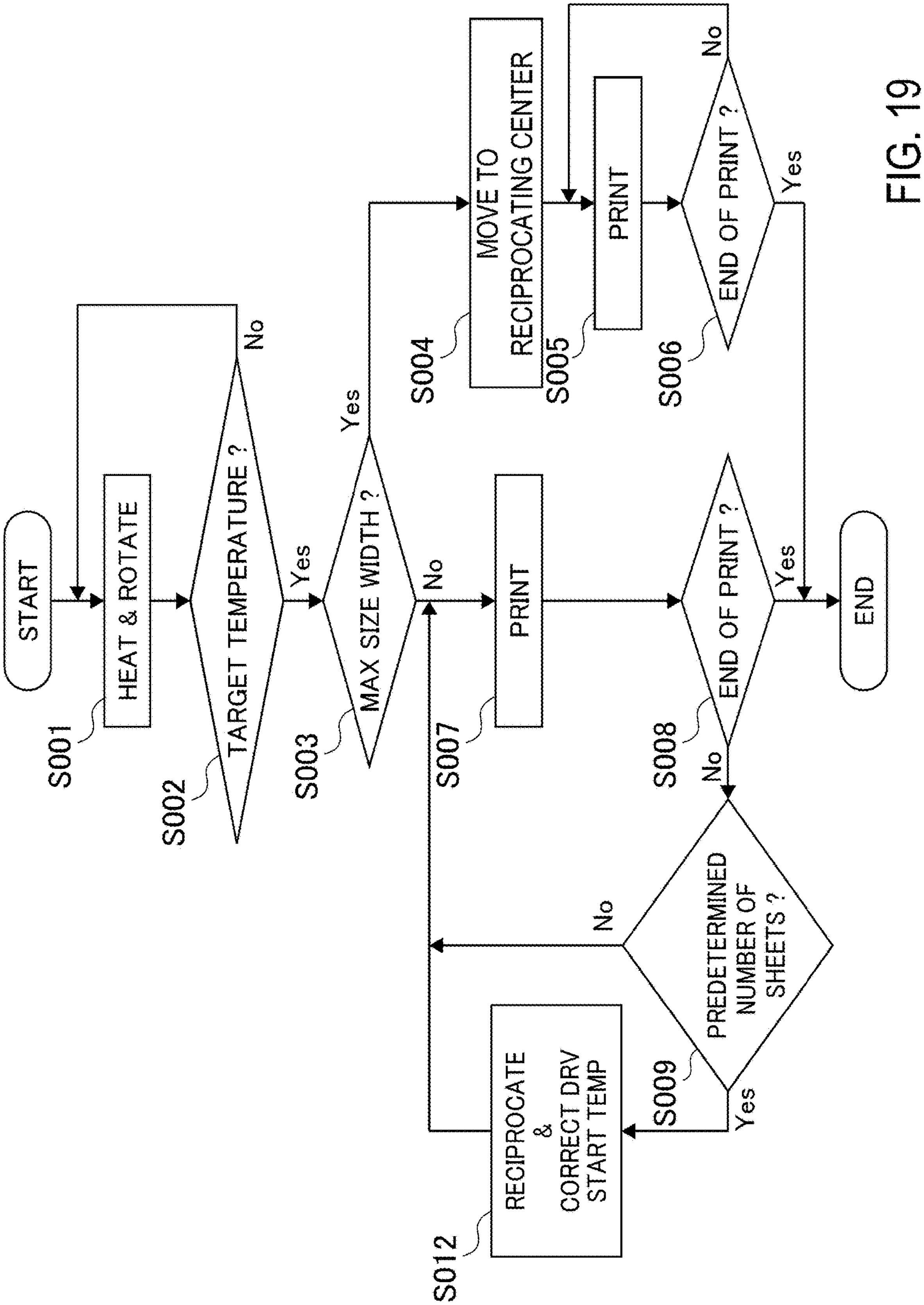

FIG. 19 is a flowchart of the control according to embodiment 3 regarding reciprocating operation and fan drive start temperature width correction.

DESCRIPTION OF THE EMBODIMENTS

Embodiment 1

Embodiment 1 will be explained using FIGS. 1 through 14. First, the schematic configuration of an image forming apparatus of the present embodiment is explained using FIG. 1.

[Image Forming Apparatus]

Figure 1:
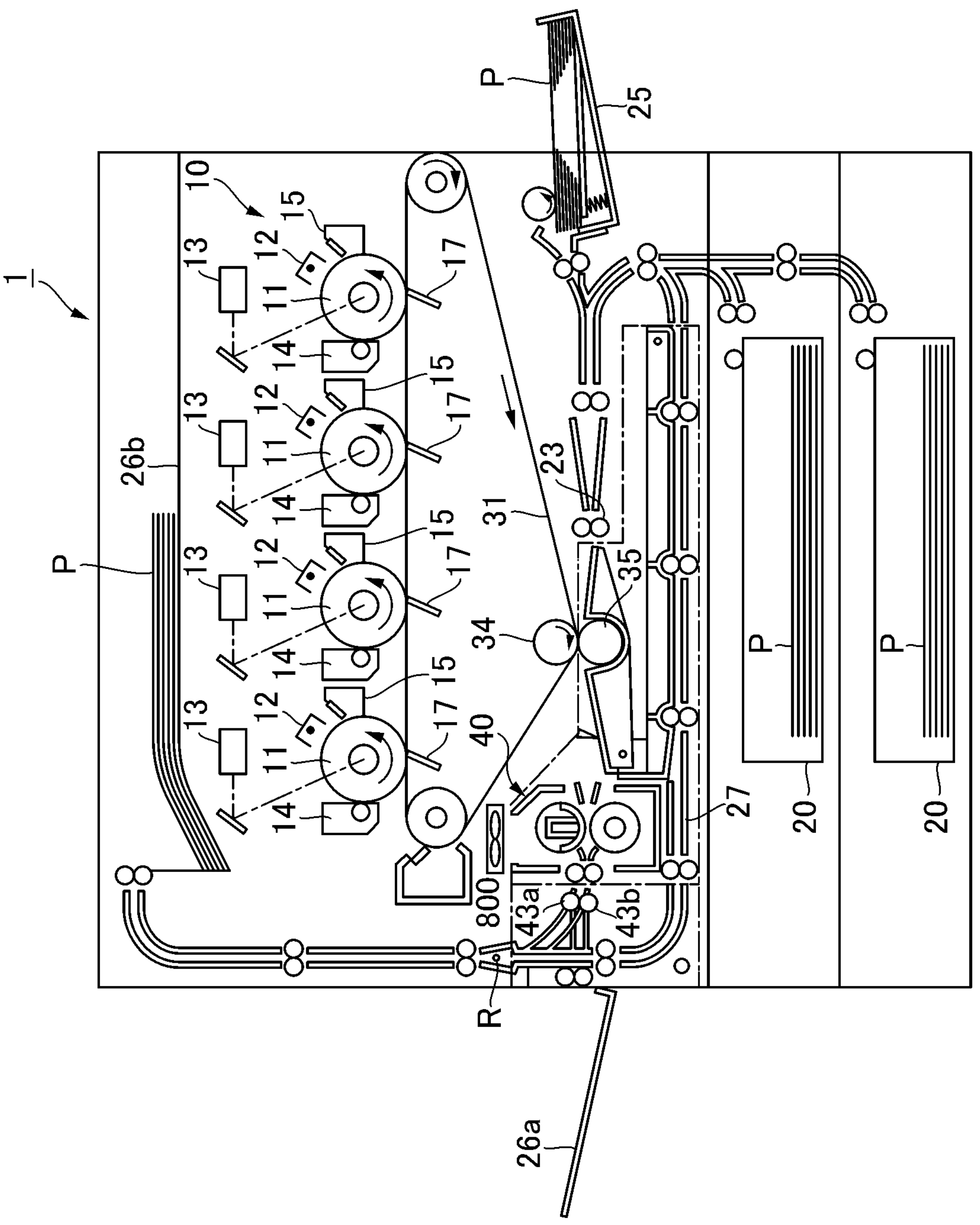
FIG. 1 is a schematic cross-sectional view of an image forming apparatus according to embodiment 1.

An image forming apparatus 1 is, for example, a printer. In a fixing portion 10, after transferring the toner image formed on a photosensitive drum 11 to a recording material P, the image is fixed on the recording material P by a fixing device 40. As shown in FIG. 1, the image forming apparatus 1 has an image forming portion (image forming station) 10 that forms toner images of Y (yellow), M (magenta), C (cyan), and Bk (black) colors. The image forming portion 10 has four photosensitive drums 11 as image bearing members corresponding to the Y, M, C, and Bk colors, in order from the left side of FIG. 1. The photosensitive drums 11, which are cylindrical photosensitive members, are driven in the arrow direction by a driving motor or other drive sources (not shown).

Around each photosensitive drum 11, respectively, are placed a charger 12, an exposure unit 13, a developing unit 14, a primary transfer blade 17, and a cleaner 15. In the following, the procedure for forming a Bk color toner image will be explained, but the procedures for forming toner images of other colors is also similar. The recording material P is, for example, a sheet of paper, plastic sheet, or the like.

First, the procedure for forming a toner image on a recording material P is explained. The surface of the photosensitive drum 11 is uniformly charged by the charger 12, and then exposed by the exposure unit 13 according to the image information. This forms an electrostatic latent image on the photosensitive drum 11. The developing unit 14 develops toner on the electrostatic latent image obtained by the exposure unit 13 to form a toner image on the photosensitive drum 11. At this time, the same process is performed for other colors.

The toner images on each photosensitive drum 11 are transferred to an intermediary transfer belt 31 as an intermediary transfer member by the primary transfer blade 17 in a sequential overlapping primary transfer. As a result, a full-color toner image is formed on the intermediary transfer belt 31. Any toner remaining on the photosensitive drum 11 after the primary transfer is removed by the cleaner 15. Thus, the photosensitive drum 11 becomes ready for the next image formation.

Meanwhile, the recording material P accommodated in a feed cassette 20 or placed in a multi-feed tray 25 is fed out one by one by the feeding mechanism (not shown) and fed into a registration roller pair 23. The registration roller pair 23 stops the recording material P once, straightens the direction of the recording material P if it is at an angle to the feeding direction, synchronizes it with the toner image on the intermediary transfer belt 31, and feeds the recording material P between the intermediary transfer belt 31 and a secondary transfer roller 35. The secondary transfer roller 35 performs a secondary transfer of the toner image on the intermediary transfer belt 31 to the recording material P.

The recording material P on which the toner image is transferred is fed to the fixing device 40, where the toner image permanently fixed on the recording material P is formed by the heating and pressurizing process. The recording material P that has passed through the fixing device 40 is discharged to a discharge tray **26*a* or 26*b* by discharge rollers 43*a* and 43*b*. In the case of double-sided printing mode, the recording material P discharged by the discharge rollers 43*a* and 43*b* is switched back and fed into a double-sided feeding path 27, and is again fed into the registration roller pair 23**. Then, as described above, a toner image is formed on the back side of the recording material P.

[Fixing Device]

Next, the fixing device 40 will be explained using FIGS. 2 through 4. The fixing device 40 is equipped with a film unit 60 that heats the toner image on the recording material P and a pressure roller 70. The film unit 60 is equipped with a first rotatable member and a fixing film 603 as an endless fixing belt, and a heater 600 as a fixing portion. The heater 600 heats the fixing film 603. That is, the film unit 60 is configured to heat the flexible, thin fixing film 603 by the heater 600, which is in contact with the inner surface.

The pressure roller 70 as the second rotatable member forms a nip portion N for fixing the toner image to the recording material by nipping and feeding the recording material P bearing the toner image between it and the fixing film 603. That is, as shown in FIG. 2, the fixing film 603 forms a nip portion N by pressing the heater 600 against the pressure roller 70 through the fixing film 603, and nips and feeds the recording material P fed to the nip portion N. At this time, the heat generated by the heater 600 is imparted to the recording material P via the fixing film 603, and the toner image T on the recording material P is melted and fixed to the material P.

The film unit 60 is for heating and pressurizing the toner image on the recording material P. It is installed parallel to the pressure roller 70 and consists of a heater 600, a heater holder 601, a support stay 602, and a fixing film 603.

The fixing film 603 is pressed toward the pressure roller 70 so that the fixing nip portion N is of a predetermined width. The heater 600 has a substrate 610 and a heating resistor member 620 on the substrate 610, and is fixed in a recess on the underside of the heater holder 601. In the present embodiment, the heating member 620 is provided on the back side of the substrate 610 (the side not in contact with the fixing film 603), but it is not limited to this, and the heating member may be provided on the front side (the side in contact with the fixing film 603).

A semi-solid lubricant (hereinafter referred to as "grease") consisting of a solid component (compound) and a base oil component (oil) is applied to the surface of the plate 610 to reduce the sliding load between the fixing film 603 and the heater 600, and to assure the slidability between the heater 600 and the fixing film 603 and between the heater holder 601 and the fixing film 603. The grease compound include solid lubricants such as graphite and molybdenum disulfide, metal oxides such as zinc oxide and silica, and fluoropolymers such as polytetrafluoroethylene (PTFE). The grease oils include heat-resistant polymer resin oils such as silicone oil and fluoro silicone oil. In the present embodiment, the grease is made of PTFE powder particles (particle size 3 μm) as the compound and fluoro silicone oil as the oil.

The fixing film 603 is a cylindrical film for heating and pressurizing the toner image on the recording material at the fixing nip portion N. FIG. 4 shows the layer structure of the fixing film 603. In the present embodiment, an elastic layer 603*b* and a release layer 603*c* are provided on a base material 603*a*, and an inner sliding layer 603*d* is provided on the inner surface of the base material 603*a*. Specifically, the base material 603*a* is a cylindrical member made of a nickel alloy with an outer diameter of 30 mm, a length (in the rotation axis direction of the pressure roller 70 and in the longitudinal direction) of 340 mm, and a thickness of 30 μm. Furthermore, a silicone rubber layer with a thickness of 400 μm is formed on the base material 603*a* as the elastic layer 603*b*, and a fluorocarbon resin tube with a thickness of about 20 μm is coated on the elastic layer 603*b* as the release layer 603*c*. Furthermore, a polyimide layer (PI layer) with a thickness of about 10 μm is used as the inner sliding layer 603*d*.

A heater holder 601 (hereafter referred to as holder 601) is a member that holds the heater 600 pressed toward the fixing film 603. The holder 601 has a semi-circular arc shape in cross section and functions to regulate the rotation path of the fixing film 603. The heater holder 601 is made of high heat-resistant resin or the like, and in this embodiment, ZENITE 7755 (trade name) manufactured by Du Pont de Nemours and Company is used.

A support stay 602 is a member that supports the heater 600 via the heater holder 601. The support stay 602 should be made of a material that does not flex easily even when a large load is applied, and stainless steel (SUS304) is used in the present embodiment.

Figure 3:
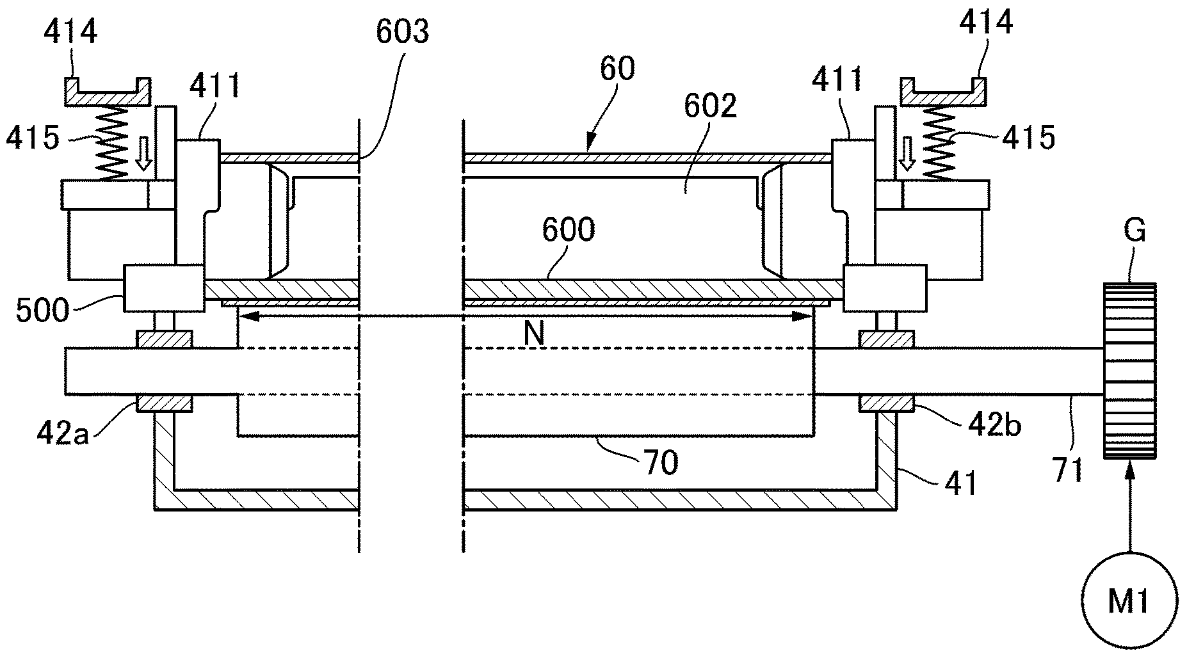
FIG. 3 is a schematic longitudinal sectional view of the fixing device according to embodiment 1.
Figure 4:
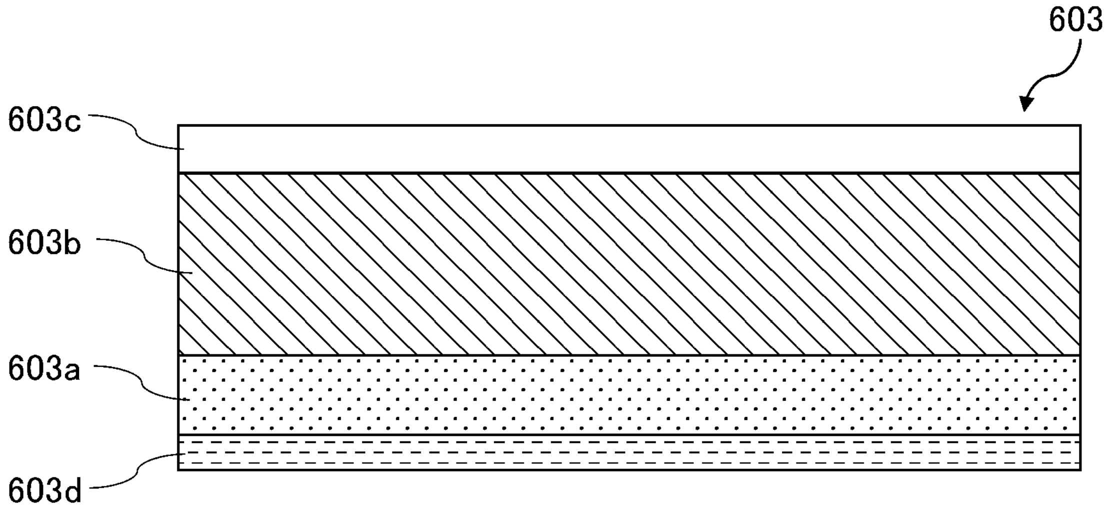
FIG. 4 is a cross-sectional schematic view of the fixing film according to embodiment 1.

As shown in FIG. 3, the support stay 602 is supported by flanges 411 at each end of its longitudinal direction. The flanges 411 regulate the moving direction of the fixing film 603 in the longitudinal direction and the shape of the film in the circumferential direction. Heat-resistant resin or the like is used for the flange 411, and in the present embodiment, polyphenylene sulfide (PPS) is used. A pressure spring 415 is provided between the flange 411 and a pressure arm 414 in a contracted state. With the above configuration, the elastic force of the pressure spring 415 is transmitted to the heater 600 via the flange 411 and the support stay 602. The fixing film 603 is then pressed against the pressure roller 70 with a predetermined pressing force to form a fixing nip portion N of a predetermined width. The pressing pressure in this embodiment is about 156.8 N at one end, and the total pressure is about 313.6 N (32 kgf).

A connector 500 is a power-feeding member that is electrically connected to the heater 600 to apply voltage to the heater 600, and is detachable and attachable to one end side of the heater 600 in the longitudinal direction.

Figure 2:
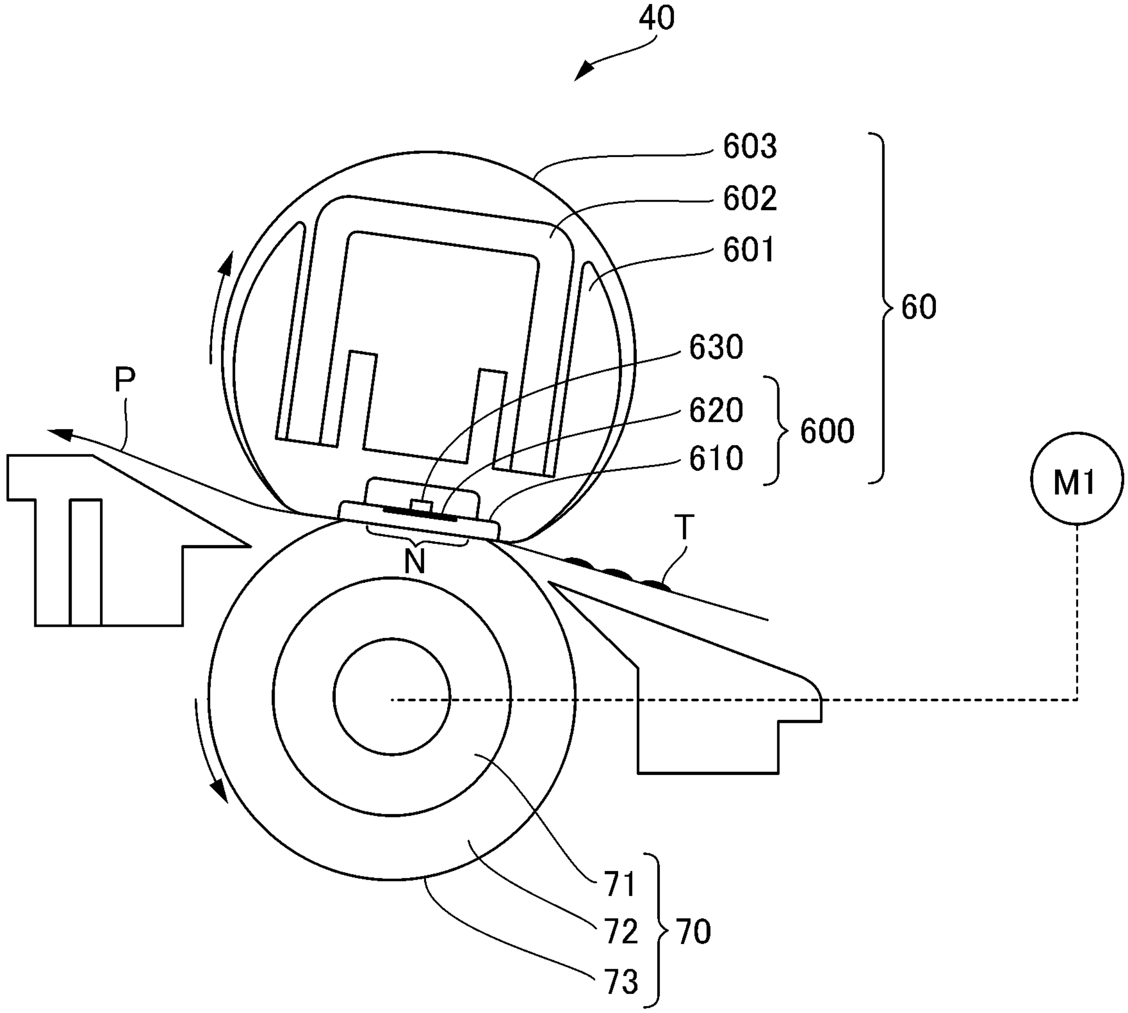
FIG. 2 is a schematic cross-sectional view of a fixing device according to embodiment 1.

As shown in FIG. 2, the pressure roller 70 is a member that forms the nip portion N by being pressured by the film unit 60. The pressure roller 70 has a multilayer structure with an elastic layer 72 on a metal core 71 and a release layer 73 on the elastic layer 72. Stainless steel (SUS), sulfur and sulfur composite free-cutting steel (SUM), and aluminum can be used as the metal core 71. Silicone rubber, sponge rubber, or elastic bubble rubber can be used as the elastic layer 72. A fluoropolymer material such as tetrafluoroethylene perfluoroalkyl vinyl ether copolymer (PFA) can be used as the release layer 73. The pressure roller 70 in the present embodiment consists of a stainless steel metal core 71, an elastic layer 72 of silicone rubber, and a release layer 73 of PFA tubing, with an outer diameter of about 25 mm and a longitudinal length of 330 mm for the elastic layer.

As shown in FIG. 3, the core 71 of the pressure roller 70 is rotatably held on a side plate 41 that constitutes the frame of the fixing device 40 via bearings 42*a* and 42*b*, and a gear G is provided at one end of the core 71 to transmit the driving force of the fixing drive motor M1 to the core 71. As shown in FIG. 2, the pressure roller 70 driven by the fixing drive motor M1 rotates and drives in the arrow direction, transmitting the driving force to the fixing film 603 in the fixing nip portion N for driven rotation. The fixing control portion 90 (see FIG. 11 below) controls the fixing drive motor M1 so that the surface speed of the pressure roller 70 is 200 mm/sec in the present embodiment.

Thermistor (TH) 630, shown in FIG. 2, is a temperature sensor installed on the back side of heater 600 to detect the temperature of heater 600. The thermistor 630 is connected to the control circuit section 90 via an A/D converter and sends an output to the control circuit section 90 according to the detected temperature. The control circuit portion 90 is a circuit equipped with a CPU that performs calculations associated with various controls and a ROM or other non-volatile medium. The ROM stores programs, which are read and executed by the CPU to perform the various controls. The control circuit portion 90 is electrically connected to the power supply so as to control the energization of the power source. The control circuit portion 90 reflects the temperature information acquired from the thermistor 630 in the power supply source energization control and controls the power supplied to the heater 600. This system uses a method of adjusting the amount of heat generated by heater 600 by controlling the wavenumber or phase control for the power source output, so that heater 600 is maintained at a predetermined temperature when fixing toner on recording material.

[Reciprocating Mechanism]

Next, a reciprocating mechanism 700 of the present embodiment is explained. The fixing film 603 is formed of a soft resin or the like with relatively good mold-releasing properties, such as PFA or PTFE, for its surface layer to prevent toner adhesion from the recording material. Therefore, the surface of the fixing film 603 is easily scratched in the rotational direction (circumferential direction) by the paper edges (burrs) that occur at the edge cut of the paper when the paper or other recording material passes through the nip portion N and the paper is cut. These scratches ("paper edge damages") tend to become deeper and larger as the recording material repeatedly passes through the same spot against the fixing film 603. In other words, the surface of the fixing film 603 is locally scratched.

If the surface of the fixing film 603 has deeper and larger paper edge damages, when the maximum size width of the recording material passes through the nip portion N in the widthwise direction that intersects the feeding malfunction direction of the recording material, the position of the scars may overlap with the image area of the recording material, causing a thread-like image defect to occur on the recording material after fixing.

Therefore, the present embodiment has a reciprocating mechanism 700 as a reciprocating moving portion that reciprocates the fixing device 40 in the widthwise direction (reciprocating movement) in order to distribute or disperse paperedge damages in the widthwise direction and to suppress deep and large localized damages on the surface of the fixing film 603. This reciprocating mechanism 700 is explained using parts (a) and (b) of FIG. 5. Part (a) of FIG. 5 shows a side view of the reciprocating mechanism 700, and part (b) of FIG. 5 shows a top view of the reciprocating mechanism 700.

In the present embodiment, the fixing device 40 is supported by a roller 706 and can move back and forth in the widthwise direction by moving on a slider 704 provided on the main assembly of the image forming apparatus 1 by rotation of the roller 706.

The reciprocating mechanism 700 has a reciprocating cam 703 and a reciprocating motor M2. The side plate of the fixing device 40 is provided with a projection **40*a* that fits into a slot 703*a* of the reciprocating cam 703. The reciprocating cam 703 is fixed to the main assembly of the image forming apparatus 1, which can be rotated by the reciprocating motor M2. The reciprocating motor M2 is composed of a stepping motor and controls the rotation of the reciprocating cam 703. The reciprocating cam 703 is formed in a cylindrical shape with a slot 703*a* on its outer circumference. This groove 703*a* is formed in a shape that displaces the projection 40*a* fitted to the reciprocating cam 703** in an axial direction (widthwise direction) as it advances in the circumferential direction, specifically in an abbreviated V-shape as shown in the Figure.

When the reciprocating cam 703 rotates, the projection **40*a* fitted in the slot 703*a* moves along the groove 703*a* in the axial direction of the reciprocating cam 703. That is, as the reciprocating cam 703 fixed to the image forming apparatus 1 rotates, the projection 40*a* secured to the fixing device 40 moves in the rotational direction of the reciprocating cam 703. This makes it possible to move the recording material P fed direction by the image forming apparatus 1 and the fixing device 40** relatively with respect to the widthwise direction.

As a result, it is possible to suppress the edge of the recording material P from repeatedly passing through one part of the surface of the fixing film 603 (and also the pressure roller 70) and to delay the progress of wear caused by contact between the fixing film 603 (and also the pressure roller 70) and the edge of the recording material. In this embodiment, as shown in FIG. 6, the slot **703*a* of the reciprocating cam 703 is formed so that, for example, half a rotation of the reciprocating cam 703 causes the fixing device 40 to move back and forth in the range of 3 mm in the widthwise direction. FIG. 6 shows the relationship between the angle of rotation of the reciprocating cam 703 (phase: deg) and the amount of moving direction of the fixing device 40 in the widthwise direction (reciprocation amount: mm). The position with a reciprocation amount of 0 mm is the home position, and specifically, the home position is defined by the rotation phase detection sensor (not shown) of the reciprocating cam 703**.

As can be understood from FIG. 6, by rotating the reciprocating cam 703, it is possible to shift the position of the fixing device 40 relative to the discharge rollers **43*a* and 43*b*** with respect to the widthwise direction in a fixed cycle. In the case of recording material P of the maximum size width that can be image forming, the effect of paper edge damages is not apparent because recording material of an even larger size width does not pass through the nip portion N.

In the present embodiment, during image forming of the maximum size width recording material P, the reciprocation operation is stopped at the position indicated by symbol b in FIG. 6, so that the space in the widthwise direction including the amount of reciprocation of the fixing device 40 that must be secured in the main assembly of the apparatus of the image forming apparatus 1 is reduced. The position indicated by symbol b in FIG. 6 is the position where the center of the widthwise direction in the nip portion N coincides with the center of the widthwise direction of the discharge rollers **43*a* and 43*b*** (called the reciprocation center).

[Cooling Mechanism]

Next, a cooling mechanism 800 of the present embodiment will be described using FIG. 7. It is known that in a fixing device, when recording material with a smaller width (small-sized recording material) than the recording material with the largest width (largest-sized recording material) continuously passes through the nip portion N with respect to the widthwise direction orthogonal to the feeding direction of the recording material, a problem called non-passing portion heating up occurs.

The following is a specific explanation. When the largest-sized recording material is passed through the nip portion N to fix the toner image on the recording material, the surfaces of the fixing film and pressure roller have an approximately uniform temperature distribution over the entire fixing portion with respect to the widthwise direction. However, when continuously fixing small-sized recording material, the temperature of the surfaces of the fixing film and pressure roller in the non-passing portion where the recording material does not pass rises excessively. This is because when small-sized recording material is continuously passed through the nip portion N, heat is not taken away by the recording material in the non-passing portion area where the recording material does not pass, and heat is partially accumulated in that portion.

If the temperature of the non-passing area rises due to the continuous passing of small-sized recording material through the nip portion N, the recording material will pass through the non-passing area in the small-sized recording material when the larger-sized recording material, including the largest-sized recording material, is passed through the nip portion N in the next job. In this case, if the non-passing area exceeds the appropriate fixing temperature, the toner melts excessively and a part of it remains on the fixing film, which is fixed on the recording material after a delay of one lap. This causes an image defect called high-temperature offset.

In addition, uneven temperature in the longitudinal direction of the non-passing area causes uneven gloss on the image. Furthermore, when the temperature rise reaches a high temperature, control may be performed to suppress the temperature rise in the non-passing area by increasing the interval between recording material continuously passing through the nip portion N. In this case, productivity is reduced. The temperature rise in the non-passing area increases under conditions where the amount of heat lost by the recording material increases. For example, when the number of sheets processed per unit time (productivity) is large, or when the weight per unit area of recording material is large (so-called thick paper).

Therefore, in the present embodiment, a cooling mechanism 800 is provided to suppress the temperature rise of the non-passing portion of the fixing film 603, which occurs when small-sized recording material is continuously processed for fixing, by cooling (air blowing). As shown in FIG. 7, a cooling mechanism 800 has a fan 44*a* as the first air blowing portion, a fan 44*b* as the second air blowing portion, a duct 45*a* leading the air of the fan 44*a*, and a duct 45*b* leading the air of the fan 44*b*. The ducts 45*a* and 45*b* have openings 46*a* and 46*b*, respectively, and the openings 46*a* and 46*b* are located opposite to the first and second areas on both ends of the fixing film 603, which become non-passing areas when fixing small-sized recording material. The airflow from the fans 44*a* and 44*b* is guided through the openings 46*a* and 46*b* to the first and second areas of the fixing film 603.

That is, the fan 44*a* blows air through the duct 45*a* toward the first area of the fixing film 603 that is on the first end side of the fixing film 603 from the center of the fixing film 603 with respect to the widthwise direction that intersects with respect to the feeding direction of the recording material. The fan 44*b* also blows air through the duct 45*b* toward the second region of the fixing film 603, which is the second end side opposite to the first end side from the center of the fixing film 603 in the widthwise direction. Here, the first and second areas correspond to the areas on both sides in the widthwise direction of the area through which the small-sized recording material passes when the small-sized recording material is passed through the fixing nip portion N, in other words, the area through which the small-sized recording material does not pass.

The cooling mechanism 800 has shutters 47*a* and 47*b* as adjusting members that adjust the opening width of the openings 46*a* and 46*b* according to the width of the recording material used, and a shutter driving portion 48 (FIG. 8) that drives the shutters 47*a* and 47*b*. The shutter 47*a* as the first shutter can change the opening width of the opening 46*a* of the duct 45*a* as the first duct. The shutter 47*b* as the second shutter can change the opening width of the opening 46*b* of the duct 45*b* as the second duct.

The fans 44*a*, 44*b*, ducts 45*a*, 45*b*, openings 46*a*, 46*b*, and shutters 47*a*, 47*b* are symmetrically arranged in the longitudinal direction (widthwise direction) of the fixing film 603. In the present embodiment, axial flow fans are used as fans 44*a* and 44*b*, but centrifugal fans such as sirocco fans may also be used.

Such operation of the fans 44*a* and 44*b* is performed when the temperature of a thermistor (temperature sensing portion) 631 in FIG. 9 exceeds a predetermined temperature. The thermistor 631 as the temperature sensing portion that detects the temperature of the first rotatable member is located inside the fixing film 603, for example, contacting or in close proximity to the inner surface of the fixing film 603 on the edge side rather than the center with respect to the widthwise direction of the film 603. The thermistor 631 is in contact or proximity to the inner circumferential side of the fixing film 603 corresponding to the first or second area. In FIG. 9, the thermistor 631 is positioned near the edge of the second area on the back side of the fixing film 603 and detects the temperature of the fixing film 603 in this area. A control circuit 90 controls the driving and stopping of the fans 44*a* and 44*b* based on the temperature detected by the thermistor 631. The thermistors 631 may be provided in both the first and second areas. The fan that cools that area may then be operated according to the temperature detected by each thermistor.

[Shutter Drive Configuration]

Next, the drive configuration of shutters 47*a* and 47*b* will be explained using FIGS. 8 through 10. A shutter driving portion 48 has a support plate 49, rack gears 50*a* and 50*b*, a pinion gear 51, and a shutter motor M3. The two shutters 47*a* and 47*b* on the left and right sides are supported by the support plate 49 that extends in the widthwise direction (right and left direction in FIGS. 9 and 10), forming openings 46*a* and 46*b*, and is capable of sliding in the widthwise direction along the plate surface. The shutters 47*a* and 47*b* are provided with rack gears 50*a* and 50*b*, respectively, and the rack gears 50*a* and 50*b* are positioned between the pinion gears 51 and are in gear mesh with the pinion gears 51, respectively.

When the pinion gear 51 is rotated forward and backward by the forward and reverse rotation driving of the shutter motor M3, the shutters 47*a* and 47*b* on both sides are linked together to open and close the corresponding openings 46*a* and 46*b* in a symmetrical relationship with respect to the widthwise direction. As shown in FIG. 10, the openings 46*a* and 46*b* on both sides in the widthwise direction are provided from a position α slightly closer to the center than the non-passing portion that occurs when the minimum width recording material is passed through the nip portion N to a position β of the maximum passage width W1. The shutters 47*a* and 47*b* on both sides of the widthwise direction are arranged to close the openings 46*a* and 46*b* by a predetermined amount according to the size of the recording material by moving direction from the center of the longitudinal direction of the support plate 49 to the edge.

When the width information of the recording material P is the maximum size recording material, the control circuitry 90 controls the shutter driving portion 48 to move to the fully closed position where the openings 46*a* and 46*b* are closed by the shutters 47*a* and 47*b*, as shown in FIG. 9. When the width information of the recording material P is a small-sized recording material, such as A4 portrait feed-size width, the control circuit 90 moves the shutters 47*a* and 47*b* to the fully open position where the openings 46*a* and 46*b* are opened to the portion corresponding to the non-passing portion, as shown in FIG. 10. The position information of the shutters 47*a* and 47*b* is detected by a flag (not shown) placed at a predetermined position of the shutters 47*a* and 47*b* by a sensor (not shown) placed on the support plate 49. Specifically, the home position is defined by the shutter position with the openings 46*a* and 46*b* fully closed as shown in FIG. 9, and the amount of opening is detected from the amount of rotation of the shutter motor M3. In the present embodiment, the shutter motor M3 is a pulse motor.

[Control Portion]

The image forming apparatus 1 is equipped with a control circuit portion 90 as a control portion. The control circuit portion 90 is explained using FIG. 11. However, although various devices for operating the image forming apparatus 1 are connected to the control circuit portion 90 in addition to those shown in the figure, their illustration and explanation are omitted. FIG. 11 shows a block diagram of the control system of the main control portion of this form of the image forming apparatus 1.

The control circuit portion 90 performs various controls of the image forming apparatus 1, such as image forming operations, and has, for example, a CPU (Central Processing Unit) and a memory. The memory consists of ROM (Read Only Memory) and RAM (Random Access Memory). The memory stores various programs for controlling the image forming apparatus 1 and various data such as the maximum size width of recording material P that can form an image and the reciprocal center mentioned above, etc. The CPU can execute the various programs stored in the memory and operates the image forming apparatus 1 by executing the various programs. In the case of the present embodiment, the CPU is capable of executing "image forming job processing (program)," "reciprocation control processing (program)," and "cooling control processing (program)" stored in the memory. The memory can also temporarily store arithmetic processing results, etc. associated with the execution of various programs.

An image forming job is a series of operations from the start of image forming to the completion of image forming based on a print signal to form an image on recording material P. In other words, it is a series of operations from the start of the preliminary operation (so-called "pre-rotation") necessary for image forming, through the image forming process, to the completion of the preliminary operation (so-called "post-rotation") necessary for completing image forming. Specifically, it refers to the period from the pre-rotation (preparation operation before image formation) to the post-rotation (operation after image formation) after receiving a print signal, including the image formation period and the period between the trailing end and leading end of consecutive recording material (so-called "paper interval").

The control portion 90 is further connected to a fixing drive motor M1, reciprocating motor M2, shutter motor M3, heater energizing circuit 92, fan 44*a* on the front side, fan 44*b* on the back side, and thermistors 630 and 631 via an input/output interface. In the present embodiment, the front side is the side where the user operates the image forming apparatus 1, for example, the side where the operation panel is installed, and the rear side is the opposite side of the front side. The direction from the front side to the back side and vice versa is the widthwise direction described above.

When an instruction to start an image forming job is received from an external host device such as a personal computer or from a control panel, the control portion 90 executes the "image forming job processing" stored in the memory. The control circuit portion 90 controls the image forming apparatus 1 based on the execution of the "image forming job processing." Accordingly, the control circuit portion 90 drives the fixing drive motor M1 to rotate the pressure roller 70, thereby following the fixing film 603. The control circuit portion 90 then controls the temperature by the heater energizing circuit 92 so that the surface temperature of the fixing film 603 becomes the desired target temperature.

The control circuit 90 controls the reciprocating motor M2 to rotate the reciprocating cam 703 to perform reciprocating operation of the fixing device 40 every time a predetermined number of sheets of recording material P are discharged from the fixing nip portion N. That is, the control circuit 90 controls the reciprocating mechanism 700 to move the fixing device 40 every time a predetermined number of sheets of recording material passes through the nip portion N. In addition, at the same time when the reciprocating operation is executed, the cooling mechanism 800 is controlled to change the cooling control of the fixing film 603 on the first end portion (one end portion) and the second end portion (reverse end portion) independently of each other.

[Fan Airflow Correction]

Next, the airflow correction of fans 44*a* and 44*b* in the present embodiment is explained. As described above, when the fixing device is operated in reciprocating mode, the temperature balance at the end portion of the fixing film in the widthwise direction is out of balance. Therefore, in the present embodiment, the airflow of at least one of the fans 44*a* and 44*b* is changed according to the position of the fixing device 40 in the widthwise direction.

Specifically, when the fixing device 40 is in the center position with respect to the widthwise direction, the control circuit portion 90 sets the airflow of fan 44*a* to the first airflow and the airflow of fan 44*b* to the second airflow. This central position is the reciprocating center described above. Next, when the fixing device 40 is moved by the reciprocating mechanism 700 and the fixing device 40 is positioned on the first end side (front side) with respect to the center position in the widthwise direction, the airflow of the fan 44*a* is set to the third airflow which is smaller than the first airflow and the airflow of the fan 44*b* is set to the fourth airflow which is larger than the second airflow. Similarly, when the fixing device 40 is located on the second end side (back side) than the center position with respect to the widthwise direction, the airflow of fan 44*a* shall be larger than the first airflow and the airflow of fan 44*b* shall be smaller than the second airflow. In other words, the airflow of the fan on the side where the fixing device 40 is moved is lowered and the airflow of the fan on the opposite side is increased.

The airflow may be changed in steps according to the position of the fixing device 40 in the widthwise direction. For example, when the fixing device 40 is located at the first position on the first end side than the center position with respect to the widthwise direction, the airflow of the fan 44*a* is the third flow rate and the airflow of the fan 44*b* is the fourth airflow. When the fixing device 40 is located at the second position on the first end side than the first position with respect to the widthwise direction, the airflow of the fan 44*a* shall be the fifth airflow which is smaller than the third airflow and the airflow of the fan 44*b* shall be the sixth airflow which is larger than the fourth airflow. The same applies when the fixing device 40 is moved to the second end portion side.

The airflow of the fans may be changed by only one of the fans. For example, when the airflow of the fan 44*a* at the center position is set as the first airflow and the airflow of the fan 44*b* as the second airflow as described above, if the fixing device 40 is located at the first end position than the center position in the widthwise direction, the airflow of the fan 44*a* is set as the third airflow, which is smaller than the first airflow, and the airflow of the fan 44*b* is remains at the second airflow. Alternatively, when the fixing device 40 is located on the first end portion side than the center position with respect to the widthwise direction, the airflow of the fan 44*a* may remain at the first airflow and the airflow of the fan 44*b* may be the fourth airflow which is greater than the second airflow. The same applies when the fixing device 40 is moved to the second end portion side.

In the present embodiment, the airflow of at least one of the fans 44*a* and 44*b* is changed at the timing when the fixing device 40 is moved by the reciprocating mechanism 700. However, the timing for changing the airflow is not limited to this; for example, after the fixing device 40 is moved, the temperature of the area on at least one of the first and second end portions sides of the fixing film 603 can be measured, and the airflow can be changed according to that temperature. For example, if the temperature on the side where the fixing device 40 is moved is measured, the airflow may be changed when the measured temperature drops below a certain temperature, and if the temperature on the side opposite to the side where the fixing device 40 is moved is measured, the airflow may be changed when the measured temperature rises above a certain temperature. Or, the airflow may be changed after a certain number of sheets of recording material pass through the nip portion N after the fixing device 40 is moved.

In the present embodiment, the cooling efficiency by the fans 44*a* and 44*b* is changed according to the position of the fixing device 40 in the widthwise direction, by changing the airflow of at least one of the fans 44*a* and 44*b*. Therefore, even in a configuration where the fixing device 40 is moved back and forth, the temperature balance at the end portions of the fixing film 603 in the widthwise direction can be suppressed.

For example, when the fixing device 40 moves to the first end portion side, the airflow of the fan 44*a* is reduced and the airflow of the fan 44*b* is increased. This allows the side to be cooled efficiently by the fan 44*b*, which has a wider non-passing area, while suppressing excessive cooling of the side to be cooled by the fan 44*a*, which has a narrower non-passing area due to the fixing device 40 moving.

The flowchart in FIG. 12 below describes an example of control of the present embodiment. When the control circuit portion 90 receives a print signal, it starts energizing the heater 600, rotates the pressure roller 70 via the fixing drive motor M1, and heats the fixing film 603 (S001). The control circuit portion 90 determines whether the fixing temperature of the fixing film 603 has reached the desired target temperature based on the detection result of a thermistor 630 (S002). If the fixing film 603 temperature has reached the desired target temperature (Yes in S002), the control circuit 90 determines, based on the size of the recording material P, whether or not the recording material P is of the maximum size width (S003). If the recording material P is of the maximum size width in the widthwise direction (Yes in S003), the control circuit 90 controls the reciprocating motor M2 to move the fixing device 40 to the reciprocating center before the recording material P reaches the nip portion N (S004). Next, printing (image formation) is performed (S005), and the job continues until printing is completed (S006).

On the other hand, if the recording material is not the maximum width size in the widthwise direction (No in S003), printing is executed as is (S007), and the job is continued until printing is completed (S008). When the number of sheets reaches a predetermined number during the job (Yes in S009), the reciprocation operation is executed, and fan airflow correction as described above is also performed (S010).

In the present embodiment, the airflow correction of the fan employs a method in which the amount of correction is determined according to the reciprocation volume. That is, the airflow is changed in steps according to the position of the fixing device 40 in the widthwise direction. Table 1 shows an example of the airflow correction amount. In Table 1, the position of the fixing device 40 is shown as plus when the fixing device 40 moves from the center of the reciprocator to the front side and minus when the fixing device 40 moves to the back side. The airflow correction amount is expressed as a percentage increase or decrease relative to the airflow of the fan when the fixing device 40 is at the center of the reciprocator, using the airflow of the fan when the fixing device 40 is at the center of the reciprocator as a standard.

TABLE 1

| correction amount | Fixing device moved to the back side | | | | | | Fixing device moved to the front side | | | | |
|---|---|---|---|---|---|---|---|---|---|---|---|
| | Reciprocation amount [mm] | | | | | | | | | | |
| | −1.5 | −1.2 | −0.9 | −0.6 | −0.3 | 0 | 0.3 | 0.6 | 0.9 | 1.2 | 1.5 |
| front-side fan | +25% | +20% | +15% | +10% | +5% | 0 | −5% | −10% | −15% | −20% | −25% |
| back-side fan | −25% | −20% | −15% | −10% | −5% | 0 | +5% | +10% | +15% | +20% | +25% |

As shown in Table 1, for example, the fan airflow at the center of reciprocation was used as the standard, and when the reciprocation volume moved to the 0.3 mm position to the back side, the airflow of the fan 44*a* on the front side was set at +5% and that of the fan 44*b* on the back side at −5%. In another example, when the reciprocation volume moved to the 0.6 mm position on the front side, the airflow of the fan 44*a* on the front side was set at −10% and that of the fan 44*b* on the back side at +10%. In the present embodiment, the reciprocation amount per reciprocation was about 0.3 mm, and the fan airflow was also set correspondingly for every 0.3 mm.

Embodiment Example 1

Next, the results of experiments conducted with an embodiment example in which the control of the present embodiment was performed and a comparative example in which the control of the present embodiment was not performed is explained. In the embodiment example, image formation was performed according to the flow shown in FIG. 12, and airflow correction of the fan 44*a* on the front side and the fan 44*b* on the back side was performed each time a reciprocating operation was performed. In the comparative example, the airflow of fans 44*a* and 44*b* was not changed even when the fixing device 40 moved.

In the embodiment and comparative examples, image forming apparatus with the same configuration was used, and the same control was applied except for the control of the fan airflow change. The conditions for the embodiment and comparative examples were also the same. The experiments were conducted at a feeding speed of 260 mm/s for recording material, a print speed of 60 sheets/minute, paper type: CS068 (A4 size), and number of printed sheets: 1000 sheets. Reciprocation operation was performed once every 250 sheets. The temperature transition of the center position in the widthwise direction of the fixing film 603, the end position in the front side, and the end position in the back side was examined. Specifically, as shown in FIG. 16 below, a thermistor TH4 was placed at the center position in the widthwise direction, a thermistor TH5 at the front end position, and a thermistor TH6 at the back end position of the inner surface of the fixing film 603, and temperatures were measured at each position.

The results of the above mentioned experiments are shown in FIGS. 13 and 14. FIG. 13 shows the temperature transition in the comparative example, and FIG. 14 shows the temperature transition in the embodiment example. In the comparative example, as shown in FIG. 13, there were variations in the temperature transition at each position, indicating that the temperature balance in the widthwise direction of the fixing film 603 was out of balance. In contrast, in the embodiment example, as shown in FIG. 14, the temperature balance between the front and back ends of the fixing film 603 was optimally maintained, and the temperature drop at the ends was suppressed, which resulted in the suppression of fixing defects. That is, according to the configuration of the present embodiment, it was found that the temperature balance at the end of the fixing film 603 in the widthwise direction could be suppressed even in a configuration in which the fixing device 40 is moved back and forth.

Embodiment 2

Embodiment 2 is explained using FIGS. 15 through 18. In embodiment 1 described above, the configuration in which the airflow correction of the front side and back side fans are each implemented in conjunction with reciprocating operation is explained. In contrast, in the present configuration, the opening widths of the shutters on the front and back sides are corrected in conjunction with the reciprocating operation. Since the other configurations and actions are similar to those of embodiment 1 described above, the drawings and explanations of similar configurations are omitted or simplified, and the following explanation focuses on the points that differ from embodiment 1.

In the present embodiment, as in embodiment 1, the cooling mechanism 800 has a fan 44*a* on the front side and a fan 44*b* on the back side as the airflow portion, a duct 45*a* as the first duct, and a duct 45*b* as the second duct. The duct 45*a* guides air sent from the fan 44*a* toward the first area, and the duct 45*b* guides air sent from the fan 44*b* toward the second area. In the present embodiment, for example, the air blowing portion may be a single fan, and the air from this fan may be split into duct 45*a* and duct 45*b* to send the air.

It is also similar to embodiment 1 in that it has shutters 47*a* and 47*b* that change the opening width of the respective openings 46*a* and 46*b* of the ducts 45*a* and 45*b*. However, unlike embodiment 1, in the present embodiment, the shutters 47*a* and 47*b* can be driven separately. For this purpose, the present embodiment has a shutter motor M3 to drive shutter 47*a* and a shutter motor M4 to drive shutter 47*b*, as shown in FIG. 15. FIG. 15 is a block diagram of the control portion of the main control system in the image forming apparatus 1 of the present embodiment, and the shutter motor M4 is added to the block diagram of FIG. 11 of embodiment 1. In FIG. 15, thermistors TH1 to TH6 are also added to FIG. 11.

The location of the thermistor as a temperature detection portion that detects the temperature of the heater 600 or fixing film 603 in the present embodiment is explained using FIG. 16. In the present embodiment, a thermistor TH1 is provided so that it can detect the temperature of the heater 600 area through which all the recording material used in the image forming apparatus 1 passes. For this purpose, the thermistor TH1 is installed in the center of the heater 600 in the longitudinal direction. Thermistors TH2 and TH3 are located between the center and the end of the heater 600 in the longitudinal direction, respectively; thermistor TH4 is located in the center of the inner surface of the fixing film 603, and thermistors TH5 and TH6 are located on the end side of the inner surface of the fixing film 603, respectively. Thermistors TH4, TH5, and TH6 are used to detect the temperature of the center portion of the fixing film 603 and the non-passing area of the recording material P.

That is, thermistor TH4 is disposed inside the fixing film 603, for example, contacting or in proximity to the inner circumferential surface of the center portion of the fixing film 603 in the widthwise direction to detect the temperature of the fixing film 603. Thermistors TH5 and TH6 are disposed inside the fixing film 603 and detect the temperature of the fixing film 603, for example, by contacting or in proximity to the inner circumferential surface of the first and second end portions of the fixing film 603 in the widthwise direction, compared to the center portion. In FIG. 16, the thermistor TH5 is positioned near the end of the first region on the front side of the fixing film 603 and detects the temperature of the fixing film 603 in the area. The thermistor TH6 is located near the end of the second area on the back side of the fixing film 603 and detects the temperature of the fixing film 603 in the area.

The detection information (signal values related to temperature) of the thermistors TH1, TH2, TH3, TH4, TH5, and TH6 are input to the control circuit portion 90 via an A/D converter. The control circuit portion 90 controls the power supplied to the heater 600 according to the detected temperature of the thermistor TH4. The control circuit portion 90 also controls the driving and stopping of the fans 44*a* and 44*b* based on the temperature detected by the thermistors TH5 and TH6. That is, the operation of fans 44*a* and 44*b* is performed when the temperature of thermistors TH5 and TH6 exceeds a predetermined temperature. For example, the drive of fan 44*a* is started when the temperature of the thermistor TH5 exceeds the predetermined temperature, and the drive of fan 44*b* is started when the temperature of thermistor TH6 exceeds the predetermined temperature.

FIG. 17 shows the drive configuration of the shutters in the present embodiment. As described above, in the present embodiment, the shutters 47*a* and 47*b* can be driven separately, so unlike embodiment 1, there are two shutter motors M3 and M4, and pinion gears 51*a* and 51*b* driven by the respective motors. The pinion gears 51*a* and 51*b* are meshed with the rack gears 50*a* and 50*b* of the respective shutters 47*a* and 47*b*. This allows the two shutters 47*a* and 47*b* to independently open and close against their corresponding openings 46*a* and 46*b* by forward and reverse rotation of the pinion gears 51*a* and 51*b*. The two openings 46*a* and 45*b* on both sides of the widthwise direction are designed to open 116 mm to 165 mm from the center of the longitudinal direction.

[Shutter Opening Width Correction]

Next, the opening width correction of shutters 47*a* and 47*b* in the present embodiment is explained. In the present embodiment, the opening width of at least one of the duct 45*a* formed by the shutter 47*a* and the opening width of the duct 45*b* formed by the shutter 47*b* is changed according to the position of the fixing device 40 in the widthwise direction. The opening width of the duct 45*a* formed by the shutter 47*a* is hereinafter referred to as the opening width of the shutter 47*a*, and the opening width of the duct 45*b* formed by the shutter 47*b* is hereinafter referred to as the opening width of the shutter 47*b*.

Specifically, when the fixing control portion 40 is in the center position with respect to the widthwise direction, the control circuit portion 90 shall set the opening width of shutter 47*a* to the first opening width and the opening width of shutter 47*b* to the second opening width. The central position is the reciprocal center as described above. Next, the fixing device 40 is moved by the reciprocating mechanism 700, and when the fixing device 40 is located on the first end side (front side) than the central position with respect to the widthwise direction, the opening width of the shutter 47*a* is the third opening width which is narrower than the first opening width and the opening width of the shutter 47*b* is the fourth opening width which is wider than the second opening width. Similarly, when the fixing device 40 is located on the second end side (back side) than the center position with respect to the widthwise direction, the opening width of the shutter 47*a* shall be wider than the first opening width and the opening width of the shutter 47*b* shall be narrower than the second opening width. In other words, the opening width of the shutter on the side where the fixing device 40 is moved is narrower and the opening width of the shutter on the opposite side is wider.

The opening width of the shutters may be changed in steps according to the position of the fixing device 40 in the widthwise direction. For example, when the fixing device 40 is located at the first position on the first end side than the center position with respect to the widthwise direction, the opening width of the shutter 47*a* is the third opening width and the opening width of the shutter 47*b* is the fourth opening width. When the fixing device 40 is positioned in the second position on the first end side with respect to the first position with respect to the widthwise direction, the opening width of the shutter 47*a* shall be the fifth opening width, which is narrower than the third opening width, and the opening width of the shutter 47*b* shall be the sixth opening width, which is wider than the fourth opening width. The same applies when the fixing device 40 is moved to the second end portion side.

The opening width change of the shutters may be made only for one of the shutters. For example, when the opening width of the shutter 47*a* at the center position is the first opening width and the opening width of the shutter 47*b* is the second opening width as described above, if the fixing device 40 is located on the first end side of the first position than the center position in the widthwise direction, the opening width of the shutter 47*a* is the third opening width which is narrower than the first opening width, and the opening width of the shutter 47*b* may remain at the second opening width. Alternatively, when the fixing device 40 is located on the first end side with respect to the center position with respect to the widthwise direction, the opening width of the shutter 47*a* may remain at the first opening width and the opening width of the shutter 47*b* may be the fourth opening width, which is wider than the second opening width. The same applies when the fixing device 40 is moved to the second end portion side.

In the present embodiment, the change of the opening width of at least one of the shutters 47*a* and 47*b* is made at the timing when the fixing device 40 is moved by the reciprocating mechanism 700. However, the timing for changing the opening width is not limited to this; for example, after the fixing device 40 is moved, the temperature of at least one of the areas on the first end portion side and the second end portion side of the fixing film 603 can be measured, and the opening width can be changed according to that temperature. For example, if the temperature on the side where the device is moved is measured, the opening width may be changed when the measured temperature drops below a certain temperature, and if the temperature on the side opposite to the side where the device is moved is measured, the opening width may be changed when the measured temperature rises above a certain temperature. Alternatively, the opening width may be changed after a certain number of sheets of recording material pass through the nip portion N after the fixing device 40 is moved.

In the present embodiment, the cooling efficiency by the fans 44*a* and 44*b* is changed according to the position of the fixing device 40 in the widthwise direction by changing the opening width of at least one of the shutter 47*a* and the opening width of the shutter 47*b* according to the position of the fixing device 40 in the widthwise direction. Therefore, even in a configuration where the fixing device 40 is moved back and forth, the temperature balance at the end of the fixing film 603 in the widthwise direction can be suppressed.

For example, when the fixing device 40 moves to the first end portion side, the opening width of the shutter 47*a* is narrowed and the opening width of the shutter 47*b* is widened. This allows the side to be cooled efficiently by the fan 44*b*, which has a wider non-passing area, while suppressing excessive cooling of the side to be blown by the fan 44*a*, which has a narrower non-passing area as the fixing device 40 moves.

The flowchart in FIG. 18 shows an example of the control in the present embodiment. The flowchart in FIG. 18 is simply a change of "S010" to "S011" for the flowchart in FIG. 12. For this reason, explanations of the other steps are omitted. In S009, when the number of sheets reaches the predetermined number during the job (Yes in S009), the reciprocation operation is executed, and at the same time, the aperture width correction of the shutter is performed as described above (S011).

In the present embodiment, the shutter opening width correction employs a means of determining the amount of correction according to the reciprocation amount. That is, the airflow was changed in steps according to the position of the fixing device 40 in the widthwise direction. Table 2 shows an example of the shutter opening width correction amount (hereinafter also referred to as correction width). In Table 2, the position of the fixing device 40 is shown as plus when the fixing device 40 is moved from the center of the reciprocator to the front side and minus when the fixing device 40 is moved to the back side. The correction width is based on the opening width of the shutter when the fixing device 40 is at the reciprocal center, and is expressed as the amount of increase or decrease relative to this standard opening width.

TABLE 2

| | Fixing device moved to the back side | | | | | | Fixing device moved to the front side | | | | |
|---|---|---|---|---|---|---|---|---|---|---|---|
| shutter correction | Reciprocation amount [mm] | | | | | | | | | | |
| width | −1.5 | −1.2 | −0.9 | −0.6 | −0.3 | 0 | 0.3 | 0.6 | 0.9 | 1.2 | 1.5 |
| Front-side fan [mm] | +5 | +4 | +3 | +2 | +1 | 0 | −1 | −2 | −3 | −4 | −5 |
| Back-side fan [mm] | −5 | −4 | −3 | −2 | −1 | 0 | +1 | +2 | +3 | +4 | +5 |

As shown in Table 2, for example, the opening width of the front side shutter 47*a* is +1 mm and the opening width of the back side shutter 47*b* is −1 mm when the reciprocation amount moves to the 0.3 mm position on the back side, based on the shutter position at the center of reciprocation. In another example, when the reciprocation amount moved to the 0.6 mm position on the front side, the opening width of the shutter 47*a* on the front side was set to −2 mm and the opening width of the shutter 47*b* on the back side to +2 mm. The reciprocation amount per reciprocation was approximately 0.3 mm, and the shutter opening widths were set correspondingly for every 0.3 mm.

Embodiment Example 2

Next, the results of experiments conducted with an embodiment example in which the control of the present embodiment was performed is described. In the embodiment example, image formation was performed according to the flow shown in FIG. 18, and the opening width correction of the shutter 47*a* on the front side and the opening width correction of the shutter 47*b* on the back side were each performed at each reciprocation operation. Experiments were conducted at a feeding speed of 260 mm/s, a print speed of 60 sheets/minute, a paper type of CS068 (A4 size), and a print count of 1000 sheets. Reciprocation operation was performed once every 250 sheets. The temperature trends at the center position of the fixing film 603 in the widthwise direction, at the end position of the front side, and at the end position of the back side were then examined. As a result, the temperature balance between the end positions on the front side and the back side was optimally maintained, and the edge temperature drop was suppressed, which resulted in the suppression of fixing defects. In other words, it was found that, according to the configuration of the present embodiment, the temperature balance of the edge of the fixing film 603 in the widthwise direction can be suppressed even in a configuration in which the fixing device 40 is moved back and forth.

Embodiment 3

The third embodiment is described using FIG. 19 with reference to FIGS. 15 and 16. In embodiment 1 described above, the configuration in which the airflow correction of the fans on the front side and the back side are each implemented in conjunction with the reciprocating operation, and in embodiment 2, the configuration in which the opening width of the shutters on the front side and the back side are corrected in conjunction with the reciprocating operation. In contrast, the present embodiment corrects the operating temperature conditions of the fans on the front and back side in conjunction with the reciprocating operation. Since other configurations and actions are similar to those of embodiments 1 and 2 described above, the drawings and descriptions of similar configurations are omitted or simplified, and the following description focuses on the points that differ from those of embodiments 1 and 2.

The location of the thermistor as a temperature detection portion that detects the temperature of the heater 600 or fixing film 603 in the present embodiment is the same as in embodiment 2 shown in FIG. 16. That is, the thermistor TH1 is located in the center of the heater 600 in the longitudinal direction. Thermistors TH2 and TH3 are located between the center and the end portion of the heater 600 in the longitudinal direction, respectively; the thermistor TH4 is located in the center of the inner surface of the fixing film 603; and the thermistors TH5 and TH6 are located on the end portion side of the inner surface of the fixing film 603, respectively.

The thermistors TH5 and TH6 are disposed inside the fixing film 603, for example, contacting or in proximity to the inner surface of the first and second end portions of the fixing film 603, which are closer to the inner surface of the fixing film 603 than the center portion with respect to the widthwise direction, and detect the temperature of the fixing film 603. In FIG. 16, thermistor TH5 as the first temperature detecting member is located near the end of the first region on the front side of the fixing film 603, and detects the temperature of the fixing film 603 in this region. The thermistor TH6 as the second temperature detecting member is located near the end of the second area on the back side of the fixing film 603, and detects the temperature of the fixing film 603 in this area.

The control circuit portion 90 controls the driving and stopping of the fan 44*a* based on the temperature detected by the thermistor TH5 and the driving and stopping of the fan 44*b* based on the temperature detected by the thermistor TH6. For example, the drive of the fan 44*a* is started when the temperature of the thermistor TH5 exceeds the predetermined temperature, and the drive of the fan 44*b* is started when the temperature of the thermistor TH6 exceeds the predetermined temperature. In the present embodiment, this predetermined temperature is compensated by the reciprocation amount of the fixing device 40. That is, the control circuit portion 90 changes at least one of the temperature at which the fan 44*a* starts driving and the temperature at which the fan 44*b* starts driving, depending on the position of the fixing device 40 in the widthwise direction. In the present embodiment, the airflow of the fans 44*a* and 44*b* is not changed.

Specifically, when the fixing temperature control portion 40 is in the center position with respect to the widthwise direction, the control circuit 90 sets the temperature at which the fan 44*a* starts driving as the first temperature and the temperature at which the fan 44*b* starts driving as the second temperature. This central position is the reciprocal center mentioned above. Next, the fixing device 40 is moved by the reciprocating mechanism 700, and when the fixing device 40 is located on the first end side (front side) than the center position with respect to the widthwise direction, the temperature at which the fan 44*a* starts driving is the third temperature higher than the first temperature and the temperature at which the fan 44*b* starts driving is the second temperature lower than the second temperature. Similarly, when the fixing device 40 is located on the second end side (back side) than the center position with respect to the widthwise direction, the temperature at which the fan 44*a* starts driving is lower than the first temperature and the temperature at which the fan 44*b* starts driving is higher than the second temperature. That is, the temperature at which the fan on the side where the fixing device 40 is moved is set to start driving at a higher temperature, and the temperature at which the fan on the opposite side starts driving is set to be lower. The fan drive start temperature may be changed in steps according to the position of the fixing device 40 in the widthwise direction.

The fan drive start temperature change may be made at only one of the temperatures. For example, if the drive start temperature of the fan 44*a* at the center position is the first temperature and the drive start temperature of the fan 44*b* is the second temperature as described above, when the fixing device 40 is located on the first end portion of the fixing portion compared to the center position in the widthwise direction, the drive start temperature of the fan 44*a* is the third temperature higher than the first temperature and the drive start temperature of fan 44*b* may remain at the second temperature. Alternatively, when the fixing device 40 is located on the first end portion side with respect to the widthwise direction than the center position, the drive start temperature of the fan 44*a* may be kept at the first temperature and the drive start temperature of the fan 44*b* may be kept at the fourth temperature, which is lower than the second temperature. The same applies when the fixing device 40 is moved to the second end side.

In the present embodiment, the temperature change of at least one of the drive start temperatures of the fans 44*a* and 44*b* is made at the timing when the fixing device 40 is moved by the reciprocating mechanism 700. However, the timing for changing the temperature is not limited to this; for example, after the fixing device 40 is moved, the temperature of at least one of the areas on the first end side and the second end side of the fixing film 603 can be measured, and the driving start temperature can be changed according to that temperature. For example, when the temperature on the side where the fixing device 40 is moved is measured, the drive start temperature may be changed when the measured temperature drops below a certain temperature, and when the temperature on the opposite side where the fixing device 40 is moved is measured, the drive start temperature may be changed when the measured temperature rises above a certain temperature. Or, the driving start temperature may be changed when a certain number of sheets of recording material pass through the nip portion N after the fixing device 40 is moved.

In the present embodiment, by changing at least one of the temperatures at which the fan 44*a* starts driving and the temperature at which the fan 44*b* starts driving according to the position of the fixing device 40 in the widthwise direction, the drive timing and drive time of the fans 44*a* and 44*b* according to the position of the fixing device 40 in the widthwise direction can be changed. Therefore, even in a configuration where the fixing device 40 is moved back and forth, the temperature balance at the end of the fixing film 603 in the widthwise direction can be prevented from being out of balance.

For example, when the fixing device 40 moves to the first end portion, the drive start temperature of the fan 44*a* can be increased and the drive start temperature of the fan 44*b* can be decreased to delay the drive timing of the fan 44*a* from that of the fan 44*b* or to shorten the drive time of the fan 44*a* from that of the fan 44*b*. Therefore, the side that blows air by the fan 44*a*, which has a narrower area of a non-passing portion because the fixing device 40 moves, can be suppressed from being excessively cooled, while the side that blows air by the fan 44*b*, which has a wider area of a non-passing portion, can be efficiently cooled.

The flowchart in FIG. 19 below describes a control of the present embodiment. The flowchart in FIG. 19 is simply a change of "S010" to "S012" for the flowchart in FIG. 12. For this reason, explanations of the other steps are omitted. In S009, when the number of sheets reaches the predetermined number during the job (Yes in S009), the reciprocating operation is executed, and at the same time, the fan drive start temperature correction as described above is performed (S012).

Other Embodiments

In each of the above embodiments, a configuration using a fixing film, which is a film-like member, as the fixing belt is described, but the belt may be, for example, a belt with an elastic layer or surface layer on a resin layer base. The fixing unit may also have a configuration in which the fixing belt is tensioned by a plurality of tensioning members. Furthermore, the nip portion forming member may be a belt in addition to a roller, and it is preferred that it be a rotatable member.

Furthermore, the reciprocating mechanism 700 can move the fixing device 40 and the cooling mechanism 800 back and forth, and the fixing device 40 and the cooling mechanism 800 can be integrated into a single structure. In accordance with the above embodiments, there is no need to consider the amount of movement of the fixing device 40 by the reciprocating mechanism 700, and cooling can be performed corresponding to the non-passing area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-134972 filed on Aug. 26, 2022, which is hereby incorporated by reference herein in its entirety.

What is claimed is:

1. An image forming apparatus comprising:

a fixing device including a first rotatable member, a second rotatable member configured to form a nip portion where a recording material on which a toner image is carried is nipped and conveyed between the first rotatable member and the second rotatable member and the toner image is fixed on the recording material, and a heating portion configured to heat the first rotatable member;

an air blowing portion configured to blow air;

a first duct configured to guide the air blown from the air blowing portion toward a first area of the first rotatable member on a first end side from a central portion of the first rotatable member with respect to a widthwise direction crossing to a conveyance direction of the recording material;

a first shutter capable of changing an opening width of the first duct;

a second duct configured to guide the air blown from the air blowing portion toward a second area of the first rotatable member on a second end side opposite to the first end side from the central portion of the first rotatable member with respect to the widthwise direction;

a second shutter capable of changing an opening width of the second duct;

a reciprocating portion configured to reciprocate the fixing device in the widthwise direction; and a control portion configured to change at least one opening width of the opening width of the first duct formed by the first shutter and the opening width of the second duct formed by the second shutter depending on a position with respect to the widthwise direction of the fixing device.

2. An image forming apparatus according to claim 1, wherein the opening width of the first duct formed by the first shutter is defined as an opening width of the first shutter and the opening width of the second duct formed by the second shutter is defined as an opening width of the second shutter, and wherein the control portion changes the opening width of the first shutter to a first opening width and the opening width of the second shutter to a second opening width in a case in which the fixing device is positioned in a central position with respect to the widthwise direction, and changes the opening width of the first shutter to a third opening width narrower than the first opening width and the opening width of the second shutter to a fourth opening width wider than the second opening width in a case in which the fixing device is positioned in a position on the first end side from the central position with respect to the widthwise direction.

3. An image forming apparatus according to claim 2, wherein the control portion changes the opening width of the first shutter to the third opening width and the opening width of the second shutter to the fourth opening width in a case in which the fixing device is positioned in a first position on the first end side from the central position with respect to the widthwise direction, and changes the opening width of the first shutter to a fifth opening width narrower than the third opening width and the opening width of the second shutter to a sixth opening width wider than the fourth opening width in a case in which the fixing device is positioned in a second position on the first end side from the first position with respect to the widthwise direction.

4. An image forming apparatus according to claim 1, wherein the control portion changes at least one of the opening width of the first shutter and the opening width of the second shutter at a timing when the fixing device is moved by the reciprocating portion.

5. An image forming apparatus according to claim 1, wherein the control portion controls the reciprocating portion so that the fixing device is moved each time when a predetermined number of the recording materials pass through the nip portion.

6. An image forming apparatus according to claim 1, wherein the fixing device includes a temperature detecting portion configured to detect a temperature of the first rotatable member on an end side from the central portion with respect to the widthwise direction, and wherein the control portion controls driving and stopping of the air blowing portion based on the temperature detected by the temperature detecting portion.

7. An image forming apparatus according to claim 1, wherein the reciprocating portion reciprocates the fixing device, the first shutter and the second shutter.

8. An image forming apparatus comprising:

a fixing device including a first rotatable member, a second rotatable member configured to form a nip portion where a recording material on which a toner image is carried is nipped and conveyed between the first rotatable member and the second rotatable member and the toner image is fixed on the recording material, a heating portion configured to heat the first rotatable member, a first temperature detecting portion configured to detect a temperature of the first rotatable member on a first end side from a central portion of the first rotatable member with respect to a widthwise direction crossing a conveyance direction of the recording material, and a second temperature detecting portion configured to detect a temperature of the first rotatable member on a second end side opposite to the first end side from the central portion with respect to the widthwise direction;

a first air blowing portion configured to blow air toward a first area of the first rotatable member on the first end side from the central portion with respect to the widthwise direction;

a second air blowing portion configured to blow air toward a second area of the first rotatable member on the second end side from the central portion with respect to the widthwise direction;

a reciprocating portion configured to reciprocate the fixing device in the widthwise direction; and a control portion configured to control driving and stopping of the first air blowing portion based on the temperature detected by the first temperature detecting portion and control driving and stopping of the second air blowing portion based on the temperature detected by the second temperature detecting portion, wherein the control portion configured to change at least one temperature of the temperature at which the first air blowing portion starts the driving depending on a position with respect to the widthwise direction of the fixing device and the temperature at which the second air blowing portion starts the driving.

9. An image forming apparatus according to claim 8, wherein the control portion changes the temperature at which the first air blowing portion starts the driving to a first temperature and the temperature at which the second air blowing portion starts the driving to a second temperature in a case in which the fixing device is positioned in a central position with respect to the widthwise direction, and changes the temperature at which the first air blowing portion starts the driving to a third temperature higher than the first temperature and the temperature at which the second air blowing portion starts the driving to a fourth temperature lower than the third temperature in a case in which the fixing device is positioned in a position on the first end side from the central position with respect to the widthwise direction.

10. An image forming apparatus according to claim 8, wherein the control portion changes at least one temperature of the temperature at which the first air blowing portion starts the driving and the temperature at which the second air blowing portion starts the driving at a timing when the fixing device is moved by the reciprocating portion.

11. An image forming apparatus according to claim 8, wherein the control portion controls the reciprocating portion so that the fixing device is moved each time when a predetermined number of the recording materials pass through the nip portion.

* * * * *